(12) United States Patent
Egilmez et al.

(10) Patent No.: US 11,432,014 B2
(45) Date of Patent: Aug. 30, 2022

(54) PARAMETRIC GRAPH-BASED SEPARABLE TRANSFORMS FOR VIDEO CODING

(71) Applicant: QUALCOMM Incorporated, San Diego, CA (US)

(72) Inventors: Hilmi Enes Egilmez, San Diego, CA (US); Amir Said, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/077,587

(22) Filed: Oct. 22, 2020

(65) Prior Publication Data

US 2021/0127137 A1    Apr. 29, 2021

Related U.S. Application Data

(60) Provisional application No. 62/926,284, filed on Oct. 25, 2019.

(51) Int. Cl.
*H04N 19/70*     (2014.01)
*H04N 19/176*    (2014.01)
*H04N 19/18*     (2014.01)
*H04N 19/60*     (2014.01)
*H04N 19/463*    (2014.01)
*H04N 19/61*     (2014.01)
*H04N 19/12*     (2014.01)

(52) U.S. Cl.
CPC .......... *H04N 19/70* (2014.11); *H04N 19/176* (2014.11); *H04N 19/18* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 10,306,229 B2 | 5/2019 | Zhao et al. | |
| 2017/0359584 A1* | 12/2017 | Said | H04N 19/19 |
| 2017/0359595 A1* | 12/2017 | Zhang | H04N 19/593 |
| 2018/0020218 A1 | 1/2018 | Zhao et al. | |
| 2018/0213233 A1* | 7/2018 | Koo | H04N 19/91 |

(Continued)

FOREIGN PATENT DOCUMENTS

EP    3211894 A1    8/2017

OTHER PUBLICATIONS

Bjontegaard G., "Calculation of Average PSNR Differences Between RD-curves," VCEG-M33, ITU—Telecommunications Standardization Sector, Study Group 16 Question 6, Video Coding Experts Group (VCEG), 13th Meeting, Austin, Texas, USA, Apr. 2-4, 2001, pp. 1-4.

(Continued)

*Primary Examiner* — Christopher Braniff
(74) *Attorney, Agent, or Firm* — Shumaker & Sieffert, P.A.

(57) ABSTRACT

A video decoder can be configured to receive, in a syntax structure that applies to a current block, graph-related information; determine a transform matrix based on the received graph-related syntax information; perform an inverse transform based on the determined transform matrix of one or more coefficient values to generate a residual block; and reconstruct the current block of the video data based on the residual block.

20 Claims, 16 Drawing Sheets

(56) References Cited

U.S. PATENT DOCUMENTS

| | | | |
|---|---|---|---|
| 2018/0338143 A1* | 11/2018 | Fracastoro | G06K 9/6247 |
| 2019/0373261 A1 | 12/2019 | Egilmez et al. | |
| 2020/0099924 A1 | 3/2020 | Seregin et al. | |
| 2021/0211727 A1* | 7/2021 | Salehifar | H04N 19/61 |

OTHER PUBLICATIONS

Bossen F., et al., "JVET Common test Conditions and Software Reference Configurations for SDR Video," Joint Video Experts Team (JVET) of ITU-T SG 16 WP 3 and ISO/IEC JTC 1/SC 29/WG 11, Document: JVET-L1010-v1, 12th Meeting: Macao, CN, Oct. 3-12, 2018, pp. 1-5.

Boyd S., et al., "Convex Optimization," New York, NY, USA, Cambridge University Press, 2004 (http://books.google.comlbooks"hl=en&lr=&id=mYm0bLd3fcoC&oi=fnd&pg=PRI1&dq=Boyd+Convex+Optimization&ots-tbbTtFLEIZ&sig-Mqhicb00483Pc3hyULnSKoazNN8#v=onepage&q&f=false).

Bross B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages, Retrieved from the Internet: URL: http://phenix.int-evry.fr/jvet/doc_end_user/documents/13_Marrakech/wg11/JVET-M1001-v7.zipJVET-M1001-v7.docx. [retrieved on Mar. 17, 2019] the whole document.

Chen J., et al., "Algorithm Description of Joint Exploration Test Model 1," 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Chung F.R.K., "Spectral Graph Theory," USA: American Mathematical Society, 1997.

Egilmez H. E., et al., "Graph Learning from Data under Structural and Laplacian Constraints," IEEE Journal of Selected Topics in Signal Processing, vol. 11, No. 6, Sep. 2017, pp. 825-841.

Egilmez H.E., et al., "CE6: Replacement of 4-point DST7/DCT8 with DST4/DCT4 in MTS (Test 6.1.6)," JVET-M0521-v1, Joint Video Experts Team (JVET) of ITU-T SG 16 WP 3 and ISO/IEC JTC 1/SC 29/WG 11, 13th Meeting, Marrakesh, MA, Jan. 9-18, 2019, pp. 1-11.

Egilmez H.E, et al., "GBST: Separable Transforms Based on Line Graphs for Predictive Video Coding," 2016 IEEE International Conference on Image Processing (ICIP), Sep. 2016, pp. 2375-2379.

Chen J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, 12th Meeting: Macao, CN, Oct. 3-12, 2018, JVET-L1002-v1, 48 pp.

Egilmez H.E, et al., "Graph-Based Transforms for Inter Predicted Video Coding," International Conference on Image Processing (ICIP), Quebec City, Canada, Sep. 2015, pp. 3992-3996.

Egilmez H.E, et al., "Graph-based Transforms for Video Coding," IEEE Transactions on Image Processing, CoRR, vol. abs/arXiv:1909.00952, 2019, 14 pages, Available [Online]: https://arxiv.org/abs/1909.00952.

Egilmez H.E, et al., "Parametric Graph-Based Separable Transforms for Video Coding," 2020 IEEE International Conference on Image Processing (ICIP), 2020, 5 pages.

Chen J., et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Han J., et al., "Towards Jointly Optimal Spatial Prediction and Adaptive Transform in Video/Image Coding," IEEE International Conference on Acoustics, Speech and Signal Processing (ICASSP), Mar. 2010, pp. 726-729.

Hu W., et al., "Intra-Prediction and Generalized Graph Fourier Transform for Image Coding," IEEE Signal Processing Letters, vol. 22, No. 11, Nov. 2015, pp. 1913-1917.

International Search Report and Written Opinion—PCT/US2020/057018—ISA/EPO—dated Jan. 12, 2021 14 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Jain A.K., "A Sinusoidal Family of Unitary Transforms," IEEE Transactions on Pattern Analysis and Machine Intelligence, IEEE Service Center, vol. PAMI-1, No. 4, Oct. 1, 1979, XP011242370, pp. 356-365, ISSN: 0162-8828.

Martucci S.A., et al., "Symmetric Convolution and the Discrete Sine and Cosine Transforms," IEEE Transactions on Signal Processing, IEEE Signal Processing Society, vol. 42, No. 5, May 1, 1994, XP000863873, pp. 1038-1051.

Pavez E., et al., "GTT: Graph Template Transforms with Applications to Image Coding," Picture Coding Symposium (PCS), May 2015, pp. 199-203.

Puschel M., et al., "Algebraic Signal Processing Theory: 1-D Space," IEEE Transactions on Signal Processing, vol. 56, No. 8, Aug. 2008, pp. 3586-3599.

Said A., et al., "Low-Complexity Transform Adjustments for Video Coding," 2019 IEEE International Conference on Image Processing (ICIP), Sep. 2019, pp. 1188-1192.

Strang G., "The Discrete Cosine Transform," SIAM Review, vol. 41, No. 1, Mar. 1999, pp. 135-147.

Sullivan G.J., et al., "Overview of the High Efficiency Video Coding (HEVC) Standard," IEEE Transactions on Circuits and Systems for Video Technology, vol. 22, No. 12, Dec. 2012, pp. 1649-1668.

Vapnik V. N., "An Overview of Statistical Learning Theory," IEEE Transactions on Neural Networks, vol. 10, No. 5, Sep. 1999, pp. 988-999.

Von Luxburg U., et al., "Statistical Learning Theory: Models, Concepts, and Results," Handbook of the History of Logic, vol. 10, Amsterdam, Netherlands: Elsevier North Holland, May 2011, pp. 651-706.

Zhao X., et al., "Enhanced Multiple Transform for Video Coding," Data Compression Conference, Mar. 30, 2016, XP033027689, pp. 73-82, DOI: 10.1109/DCC.2016.9 [retrieved on Dec. 15, 2016].

Wien M., "High Efficiency Video Coding," Coding Tools and Specification, Springer-Verlag, Berlin, 2015, 30 pp.

Said A., et al.," CE6: Summary Report on Transforms and Transform Signalling," Joint Video Experts Team (JVET) of ITU-T SG 16 WP 3 and ISO/IEC JTC 1/SC 29/WG 11, JVET-K0026-v1, 11th Meeting: Ljubljana, SI, Jul. 10-18, 2018, pp. 1-33.

Said A., et al., "Description of Core Experiment 6 (CE6): Transforms and Transform Signalling," Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, pp. 1-14.

Bossen F., et al., "JVET Common Test Conditions and Software Reference Configurations for SDR video," 11th Meeting; Ljubljana, SI, Jul. 10-18, 2018, Joint Collaborative Team on Video Coding (JCT-VC) of ITU-T SG 16 WP 3 and ISO/IEC JTC 1/SC 29/WG 1, No. JVET-K1010_v2, 6 pp.

* cited by examiner

4x4 DST-VII:

```
{29,  55,  74,  84}
{74,  74,   0, -74}
{84, -29, -74,  55}
{55, -84,  74, -29}
```
FIG. 3A

4-point DCT-II:

```
{64,  64,  64,  64}
{83,  36, -36, -83}
{64, -64, -64,  64}
{36, -83,  83, -36}
```
FIG. 3B

8-point DCT-II:

```
{64,  64,  64,  64,  64,  64,  64,  64}
{89,  75,  50,  18, -18, -50, -75, -89}
{83,  36, -36, -83, -83, -36,  36,  83}
{75, -18, -89, -50,  50,  89,  18, -75}
{64, -64, -64,  64,  64, -64, -64,  64}
{50, -89,  18,  75, -75, -18,  89, -50}
{36, -83,  83, -36, -36,  83, -83,  36}
{18, -50,  75, -89,  89, -75,  50, -18}
```
FIG. 3C

16-point DCT-II:

32-point DCT-II:

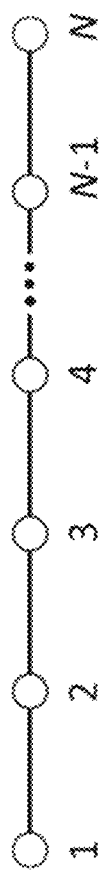
FIG. 6
FIG. 7A
FIG. 7B

PARAMETRIC GRAPH-BASED SEPARABLE TRANSFORMS FOR VIDEO CODING

This application claims the benefit of U.S. Provisional Patent Application 62/926,284, filed 25 Oct. 2019, the entire content of which is being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for graph-based separable transforms which may be used by a video encoder for transforming residual values from sample domain (also called pixel domain) to transform domain (also called frequency domain) and used by a video decoder to transform (e.g., inverse transform) from the transform domain back to the sample domain. In example video coding systems, separable transforms (such as two-dimensional DCT-2) have been used to code block residual signals obtained after prediction. This disclosure describes examples of parametric approaches to building graph-based separable transforms (GBSTs) for video coding. As one example, a GBST may be derived from a pair of line graphs, whose weights are determined based on two non-negative parameters. This disclosure describes example techniques that may optimize graph parameters used for GBSTs that better capture residual block statistics and thus improve video compression efficiency.

In one example, this disclosure describes a method of decoding video data that includes receiving, in a syntax structure that applies to a current block of the video data, graph-related information; determining a transform matrix based on the received graph-related syntax information; performing an inverse transform based on the determined transform matrix of one or more coefficient values to generate a residual block; and reconstructing the current block of the video data based on the residual block.

In another example, this disclosure describes a device for decoding video data that includes a memory configured to store the video data; and process circuitry configured to: receive, in a syntax structure that applies to a current block of the video data, graph-related information; determine a transform matrix based on the received graph-related syntax information; perform an inverse transform based on the determined transform matrix of one or more coefficient values to generate a residual block; and reconstruct the current block of the video data based on the residual block.

In another example, this disclosure describes a computer-readable storage medium having stored thereon instructions that, when executed, configure a processor to: receive, in a syntax structure that applies to a current block of the video data, graph-related information; determine a transform matrix based on the received graph-related syntax information; perform an inverse transform based on the determined transform matrix of one or more coefficient values to generate a residual block; and reconstructing the current block of the video data based on the residual block.

In another example, this disclosure describes a device for decoding video data that includes means for receiving, in a syntax structure that applies to a current block of the video data, graph-related information; means for determining a transform matrix based on the received graph-related syntax information; means for performing an inverse transform based on the determined transform matrix of one or more coefficient values to generate a residual block; and means for reconstructing the current block of the video data based on the residual block.

The details of one or more examples are set forth in the accompanying drawings and the description below. Other features, objects, and advantages will be apparent from the description, drawings, and claims.

BRIEF DESCRIPTION OF DRAWINGS

FIGS. 3A-3E are tables illustrating examples of transform types.

FIG. 6 is a conceptual diagram illustrating a line graph with N vertices.

FIGS. 7A and 7B are conceptual diagrams illustrating examples of graph weights corresponding to generalized graph Laplacian (GGL) matrices.

DETAILED DESCRIPTION

Figure 1:
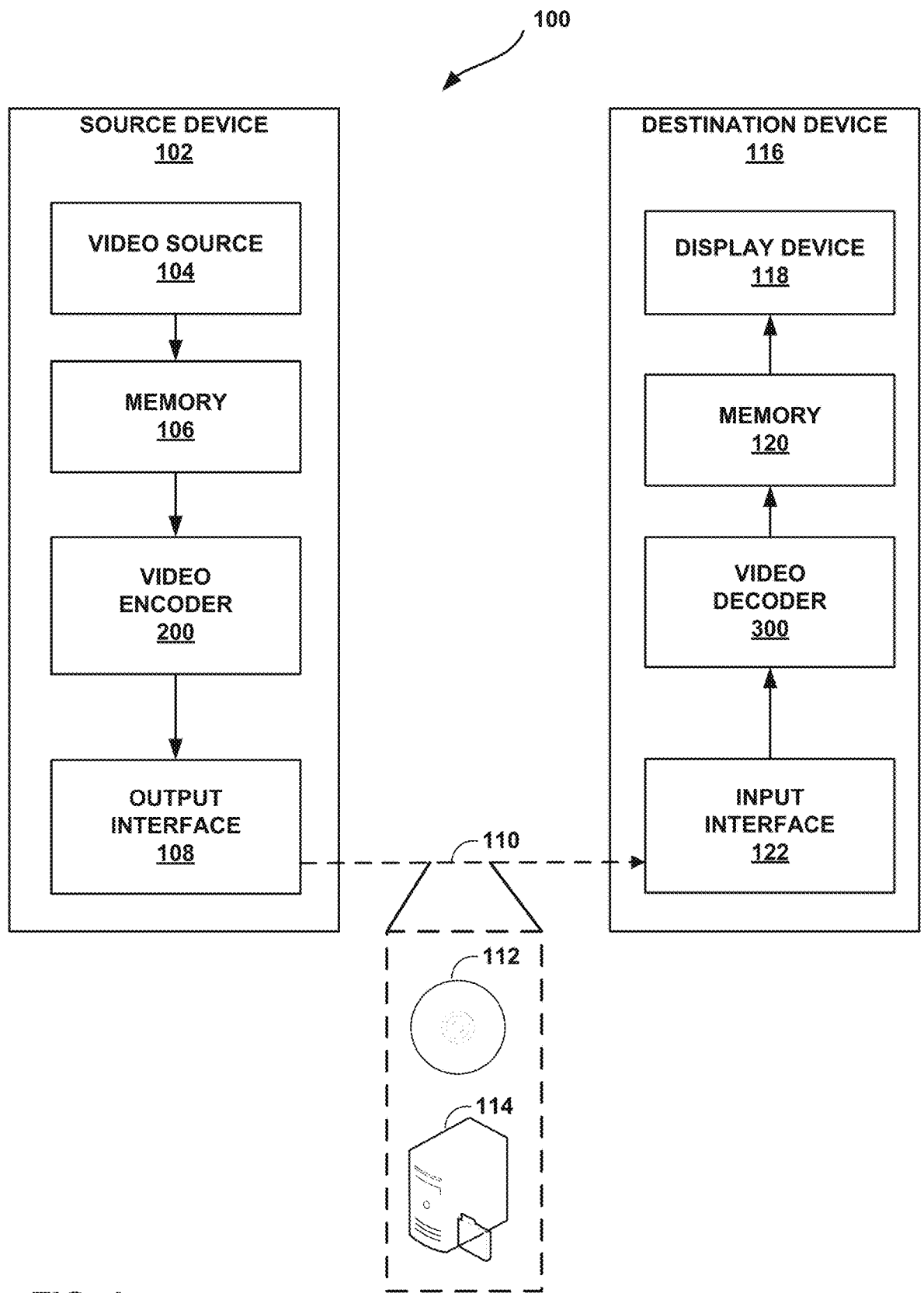
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream.

A video decoder dequantizes and inverse transforms the received transformed and quantized residual data to approximately reproduce the residual calculated by the video encoder. The video decoder adds the residual data to the prediction block to produce a reconstructed video block that matches the original video block more closely than the prediction block alone. The compression achieved by the transform and quantization processes, however, may be lossy, meaning that transform and quantization processes may introduce artifacts or distortion into the decoded video data. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure is related to transform coding and, more specifically, related to a parametric approach for designing transforms. The techniques described in this disclosure may be used in advanced video codecs and next generation of video coding standards such as VVC. Several multiple transform selection (MTS) designs extend the current MTS tool in the Versatile Video Coding (VVC) standard. The techniques described in this disclosure allow for a video encoder and video decoder to better capture residual block statistics and thus improve coding efficiency by enabling the video encoder and video decoder to use a much larger number of different of transforms. By receiving, in a syntax structure that applies to a current block, graph-related information and determining a transform matrix based on the received graph-related syntax information, however, the techniques of this disclosure allow for a video encoder and video decoder to implement this larger number of different transforms without significantly increasing signaling overhead or the memory requirements for storing the additional transforms.

In some video compression systems predating the High-Efficiency Video Coding (HEVC) standard (G. J. Sullivan, J.-R. Ohm, W.-J. Han, and T. Wiegand, "Overview of the High Efficiency Video Coding (HEVC) Standard," IEEE Trans. Circuits Syst. Video Technol., vol. 22, no. 12, pp. 1649-1668, December 2012), only the type-2 discrete cosine transform (DCT-2) is used to transform rows and columns of a residual block signal in a separable manner. One issue of using DCT-2 as the only transform option is the implicit assumption that all residual blocks share the same statistical properties. However, in practice, the residual blocks can have diverse statistical characteristics depending on video content, prediction modes and block sizes.

Testing has shown that the separable type-7 discrete sine transform (DST-7) can provide considerable coding gains over DCT-2 for small blocks, and DST-7 is adopted in HEVC for coding 4×4 intra predicted blocks. In order to further increase the diversity in transform selection with coding benefits, the Versatile Video Coding Standard (VVC), currently under development stage, employs MTS among five candidates derived based on DCT-2, DCT-8 and DST-7, where MTS can be applied including up to blocks of size 32×32, as described in A. Said and X. Zhao, "CE6: Summary report on transforms and transform signalling," Joint Video Exploration Team (WET) of ITU-T SG16 WP3 and ISO/IEC JTC 1/SC29/WG11, Ljubljana, S I, Input document JVET-K0026, July 2018.

This disclosure describes graph-based separable transforms (GBSTs) as alternatives or used in addition to DST-7 and DCT-8 for the MTS design in VVC. Graph-based transforms (GBTs) may improve coding efficiency by providing a better adaptation for diverse block statistics, as described in: H. E. Egilmez, A. Said, Y.-H. Chao, and A. Ortega, "Graph-based transforms for inter predicted video coding," in IEEE International Conference on Image Processing (ICIP), September 2015, pp. 3992-3996, E. Pavez, H. E. Egilmez, Y. Wang, and A. Ortega, "GTT: Graph template transforms with applications to image coding," in Picture Coding Symposium (PCS), 2015, May 2015, pp. 199-203, H. E. Egilmez, Y. H. Chao, A. Ortega, B. Lee, and S. Yea, "GBST: Separable transforms based on line graphs for predictive video coding," in 2016 IEEE International Conference on Image Processing (ICIP), September 2016, pp. 2375-2379, H. E. Egilmez, Y. H. Chao, and A. Ortega, "Graph-based transforms for video coding," CoRR, vol. abs/arXiv:1909.00952, 2019. [Online]. Available: https://arxiv.org/abs/1909.00952, and H. E. Egilmez, O. Teke, A. Said, V. Seregin, M. Karczewicz, "Parametric Graph-based Separable Transforms for Video Coding," IEEE International Conference on Image Processing (ICIP), 2020.

In "GBST: Separable transforms based on line graphs for predictive video coding," and "Graph-based transforms for video coding," separable GBTs (i.e., GBSTs) may be optimized by learning a pair of line graphs from data described in H. E. Egilmez, E. Pavez, and A. Ortega, "Graph learning from data under Laplacian and structural constraints," IEEE Journal of Selected Topics in Signal Processing, vol. 11, no. 6, pp. 825-841, September 2017 to model underlying row and column-wise statistics of blocks residual signals, where the associated graph Laplacian matrices are used to derive GBSTs.

"Graph-based transforms for video coding," showed that GBTs can outperform Karhunen-Loeve transforms (KLTs) derived from sample covariance matrices in terms of coding efficiency, because the graph learning approach provides a better model estimation (e.g., better generalization and variance-bias tradeoff as described in V. N. Vapnik, "An overview of statistical learning theory," IEEE Transactions on Neural Networks, vol. 10, no. 5, pp. 988-999, September 1999 and U. von Luxburg and B. Sch¨olkopf, Statistical Learning Theory: Models, Concepts, and Results. Amsterdam, Netherlands: Elsevier North Holland, May 2011, vol. 10, pp. 651-706)) than using sample covariances for deriving KLTs. One possibility from "Graph-based transforms for video coding," is that learning models with fewer parameters (which alleviates the overfitting problem) often result in a more general and robust model estimation, so that graph learning techniques can be employed to design better transforms for video coding.

This disclosure describes techniques for one or more parametric approaches to determine line graphs, whose weights are determined from two non-negative parameters. For example, GBSTs may be derived from line graphs with constant edge weights, denoted by $w_c$, and a single vertex weight $v_c$ (also called as self-loop), as described in more detail. As compared to the GBST construction techniques that allow for arbitrary graph weights in "Graph-based transforms for video coding," the example of the parametric approaches may be a more constrained variant leading to simpler models defined by fewer parameters. In addition, the empirical results in "GBST: Separable transforms based on line graphs for predictive video coding," and "Graph-based transforms for video coding," may have been provided in a simple simulation setting with their theoretical justifications. This disclosure presents experimental results in a more practical setting where the proposed GBSTs are tested on the VVC reference software.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for parametric transform derivation described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the described techniques for parametric transform derivation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 4)," Joint Video Experts Team (WET) of ITU-T SG 16 WP 3 and ISO/IEC JTC 1/SC 29/WG 11, 13th Meeting, Marrakech, M A, 9-18 Jan. 2019, WET-M1001-v7 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
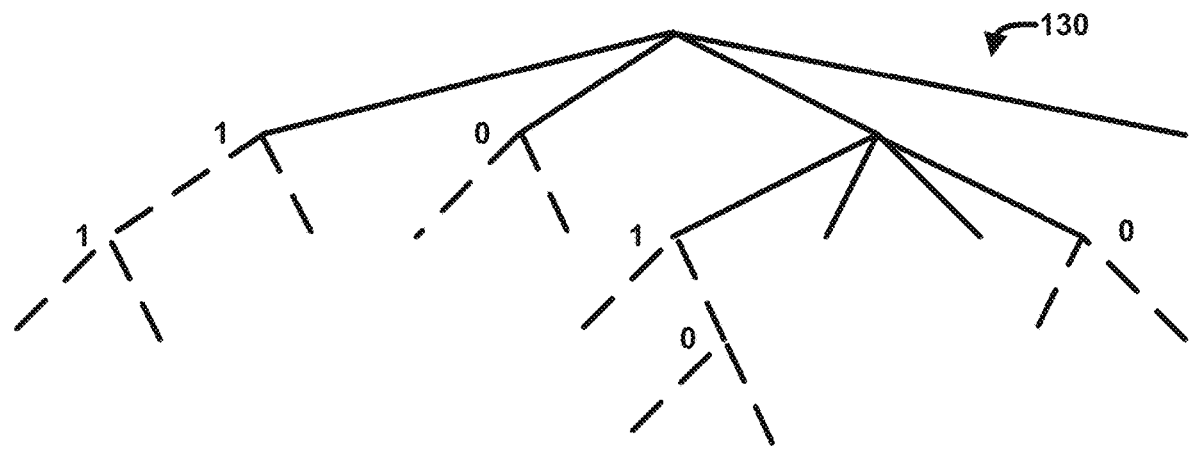
FIGS. 2A and 2B are conceptual diagrams illustrating an example quadtree binary tree (QTBT) structure, and a corresponding coding tree unit (CTU).
Figure 2B:
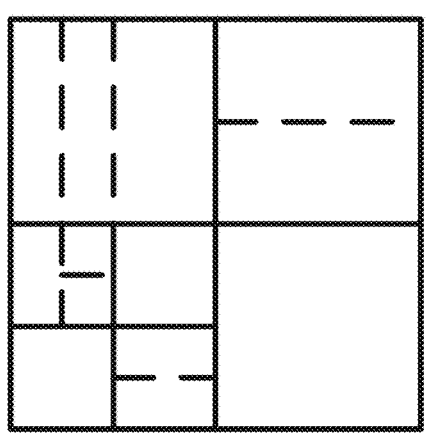

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

As described above, video coding standards may utilize transforms such as discrete sine transforms (DST) and discrete cosine transform (DCT) to transform residual data in sample domain to transform domain, at video encoder 200, and transform (e.g., inverse transform) the residual data in transform domain back to sample domain, at video decoder 300. The following describes an overview of DCTs and DSTs and also describes transform scheme used in HEVC.

Assume the input N-point vector is denoted as $x=[x_0, x_1, \ldots, x_{N-1}]^T$ and is transformed to another N-point transform coefficient vector denoted as $y=[y_0, y_1, \ldots, y_{N-1}]^T$ by multiplying a matrix, the process of which can be further illustrated according to one of the following transform formulation, wherein k ranges from 0 through N−1, inclusive:

*DCT Type-I (DCT-1)*

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $w_0 = \begin{cases} \frac{1}{\sqrt{2}}, & \text{if } n = 0 \text{ or } n = N-1 \\ 1, & \text{otheriwse} \end{cases}$, $w_1 = \begin{cases} \frac{1}{\sqrt{2}}, & \text{if } k = 0 \text{ or } k = N-1 \\ 1, & \text{otheriwse} \end{cases}$

*DCT Type-II (DCT-2)*

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $w_0 = \begin{cases} \frac{1}{\sqrt{2}}, & \text{if } k = 0 \\ 1, & \text{otheriwse} \end{cases}$

*DCT Type-III (DCT-3)*

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

where $w_0 = \begin{cases} \frac{1}{\sqrt{2}}, & \text{if } n = 0 \\ 1, & \text{otheriwse} \end{cases}$

*DCT Type-IV (DCT-4)*

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

*DCT Type-V (DCT-5)*

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = 0 \\ 1, & \text{otheriwse} \end{cases}$

*DCT Type-VI (DCT-6)*

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = 0 \\ 1, & \text{otheriwse} \end{cases}$

*DCT Type-VII (DCT-7)*

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$

*DCT Type-VIII (DCT-8)*

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

*DST Type-I (DST-1)*

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

*DST Type-II (DST-2)*

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otheriwse} \end{cases}$

*DST Type-III (DST-3)*

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otherwise} \end{cases}$

*DST Type-IV (DST-4)*

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

*DST Type-V (DST-5)*

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

-continued

DST Type-VI (DST-6)
$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7)
$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8)
$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ The transform type is specified by the mathematical formulation of the transform basis function, e.g., 4-point DST-VII and 8-point DST-VII have the same transform type, regardless of the value of N. Without loss of generality, the above transform types may be represented using the below generalized formulation:

$$y_m = \sum_{n=0}^{N-1} T_{m,n} \cdot x_n.$$

In the above equation, T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

The above transform formulations, which are applied on the 1-D input data x, can be represented in matrix multiplication form as below $$y = T \cdot x.$$

In the above equation, T indicates the transform matrix, x indicates the input data vector, and y indicates the output transform coefficients vector.

The following describes transform for 2-Dimensional (2-D) input data. The transforms described above are applied on 1-D input data, and transforms can be also extended for 2-D input data sources. Supposing X is an input M×N data array. The typical methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

In the above equation, C and R denotes the given M×M and N×N transform matrices, respectively. From the formulation, it can be seen that C applies 1-D transforms for the column vectors of X, while R applies 1-D transforms for the row vectors of X In this disclosure, for simplicity C and R may be used to denote left (vertical) and right (horizontal) transforms that both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X'_{(i \cdot N + j)} = X_{i,j}$$

Then a 1-D transform T' is applied for X' as below:

$$Y = T' \cdot X'$$

In the above equation, T' is an (M*N)×(M*N) transform matrix.

In video coding, separable 2-D transforms may be always applied since 2-D transforms require much less operation (addition, multiplication) counts as compared to 1-D transform.

The following describes transform types applied in HEVC. In some video coding standards, such as H.264/AVC, an integer approximation of the 4-point and 8-point Discrete Cosine Transform (DCT) Type-II is always applied for both Intra and Inter prediction residual. To better accommodate the various statistics of residual samples, more flexible types of transforms other than DCT Type-II are utilized in the new generation video codec. For example, in HEVC, an integer approximation of the 4-point Type-VII Discrete Sine Transform (DST) is utilized for Intra prediction residual, which is both theoretically proved and experimentally validated in J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729 that DST Type-VII is more efficient than DCT Type-II for residuals vectors generated along the Intra prediction directions, e.g., DST Type-VII is more efficient than DCT Type-II for row residual vectors generated by the horizontal Intra prediction direction.

Figures 3A, 3B, 3C, 3D:
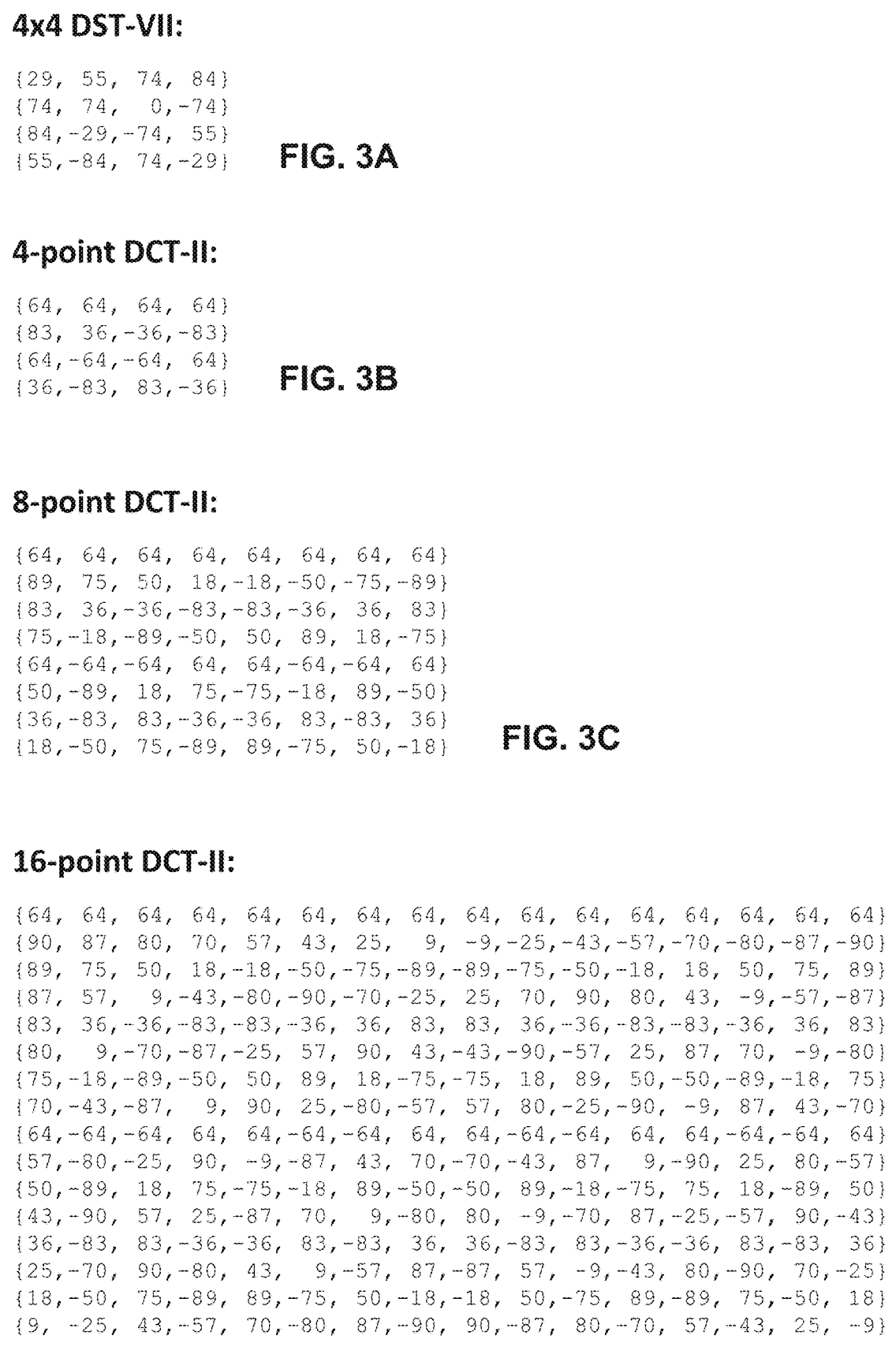
Figure 3E:
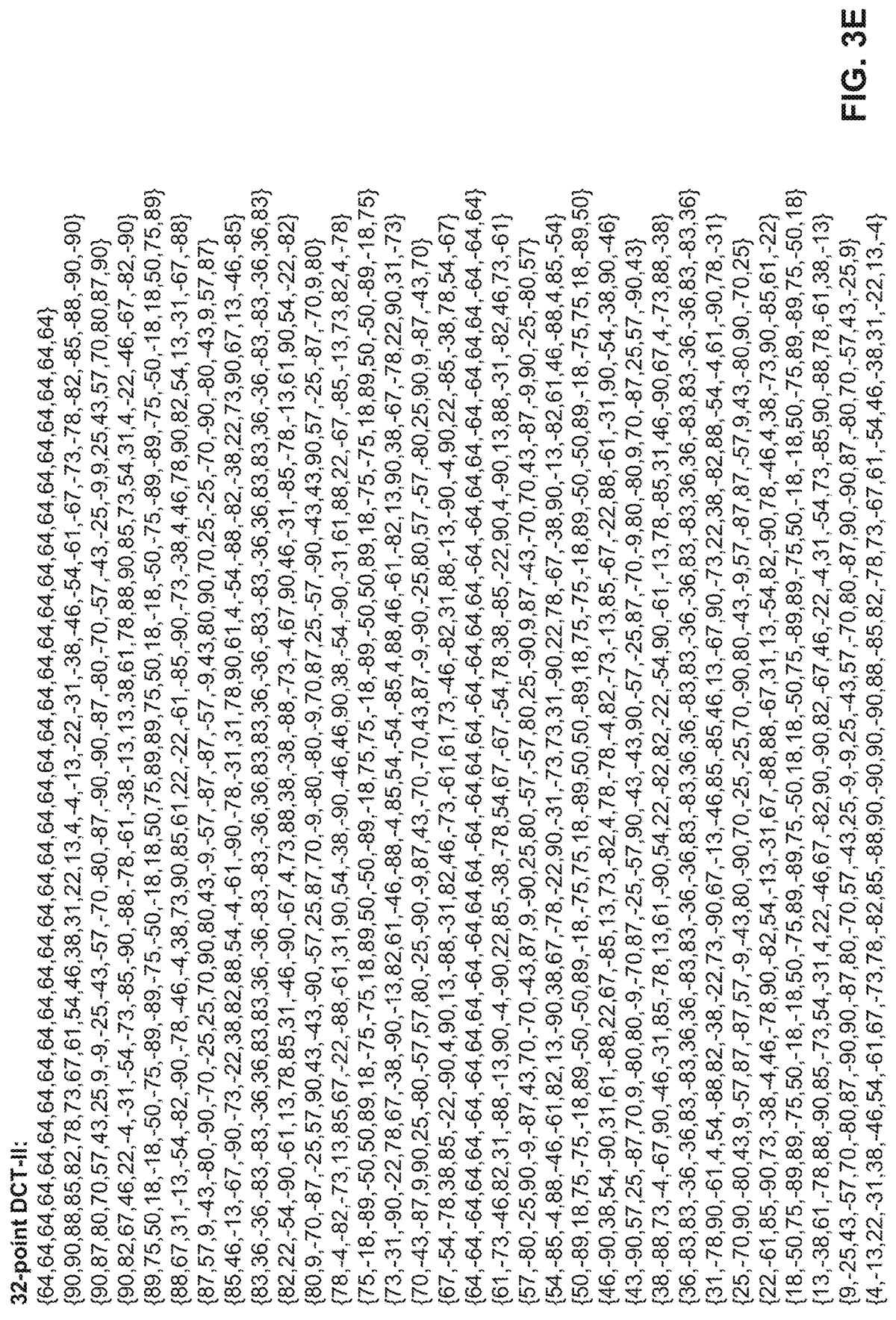

In HEVC, an integer approximation of 4-point DST Type-VII is applied only for 4×4 luma Intra prediction residual blocks. The 4-point DST-VII used in HEVC is shown in FIG. 3A. In HEVC, for residual blocks that are not 4×4 luma Intra prediction residual blocks, integer approximations of the 4-point, 8-point, 16-point and 32-point DCT Type-II are also applied, as shown in FIGS. 3B-3E.

To adapt the various characteristics of the residual blocks, a transform coding structure using the residual quadtree (RQT) is applied in HEVC, which is briefly described in X. Zhao, J. Chen, M. Karczewicz, L. Zhang, X. Li, and W.-J. Chien, "Enhanced multiple transform for video coding," *Proc. Data Compression Conference*, pp. 73-82, March 2016.

Each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure namely, the residual quadtree (RQT). The RQT allows TU sizes from 4×4 up to 32×32 luma samples.

Figure 4:
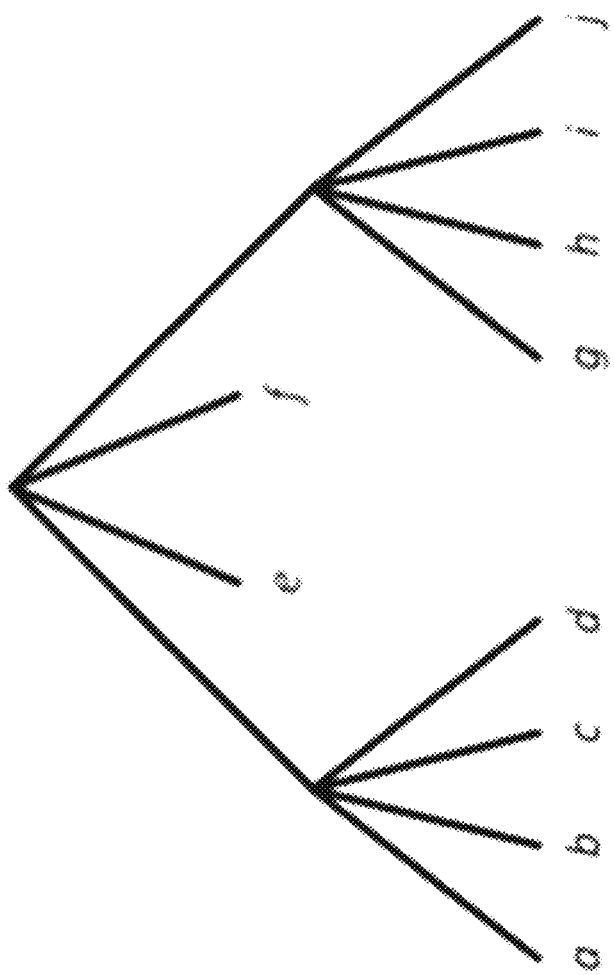
FIG. 4 is a conceptual diagram illustrating an example of a transform scheme based on residual quadtree.
Figure 4:
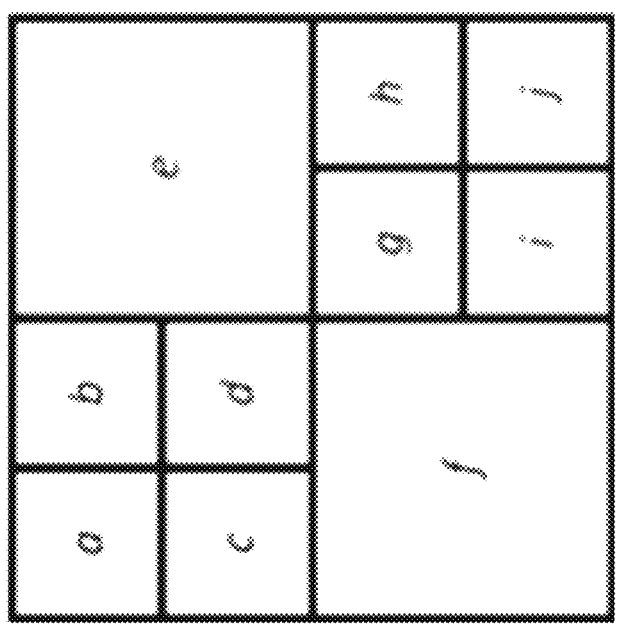

FIG. 4 shows an example where a CU includes 10 TUs, labeled with the letters a to j, and the corresponding block partitioning. Each node of the RQT is actually a transform unit (TU). The individual TUs are processed in depth-first tree traversal order, which is illustrated in the figure as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and select the coding mode with least rate-distortion cost as the best mode.

Three parameters are defined in the RQT: the maximum depth of the tree, the minimum allowed transform size and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB cannot be split any further if each included TB reaches the maximum allowed transform size, e.g., 32×32.

All these parameters interact and influence the RQT structure. Consider a case, in which the root CB size is 64×64, the maximum depth is equal to zero and the maximum transform size is equal to 32×32. In this case, the CB is partitioned at least once, because no partitioning would lead to a 64×64 TB, which is not allowed. The RQT parameters, i.e. maximum RQT depth, minimum and maximum transform size, are transmitted in the bitstream at the sequence parameter set level. Regarding the RQT depth, different values can be specified and signaled for intra and inter coded CUs.

The quadtree transform is applied for both Intra and Inter residual blocks. Typically the DCT-II transform of the same size of the current residual quadtree partition is applied for a residual block. However, if the current residual quadtree block is 4×4 and is generated by Intra prediction, the above 4×4 DST-VII transform is applied. In HEVC, larger size transforms, e.g., 64×64 transform are not adopted mainly due to limited benefit in view of the relatively high complexity for relatively smaller resolution videos.

The current MTS design in VVC uses five transform candidates derived based on combinations of DCT-2, DST-7 and DCT-8. The techniques described in this disclosure allow more general one-dimensional transforms to be derived, and the use of more transforms may outperform the existing MTS design in VVC in terms of coding gains.

Figure 5:
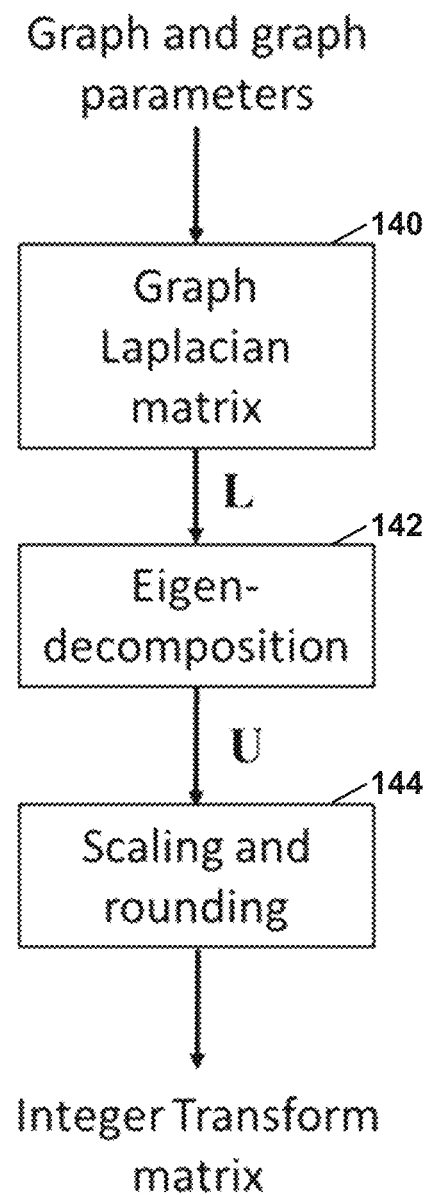
FIG. 5 is a flow chart illustrating examples for deriving an integer transform for a given graph and graph parameters.
Figure 8A:
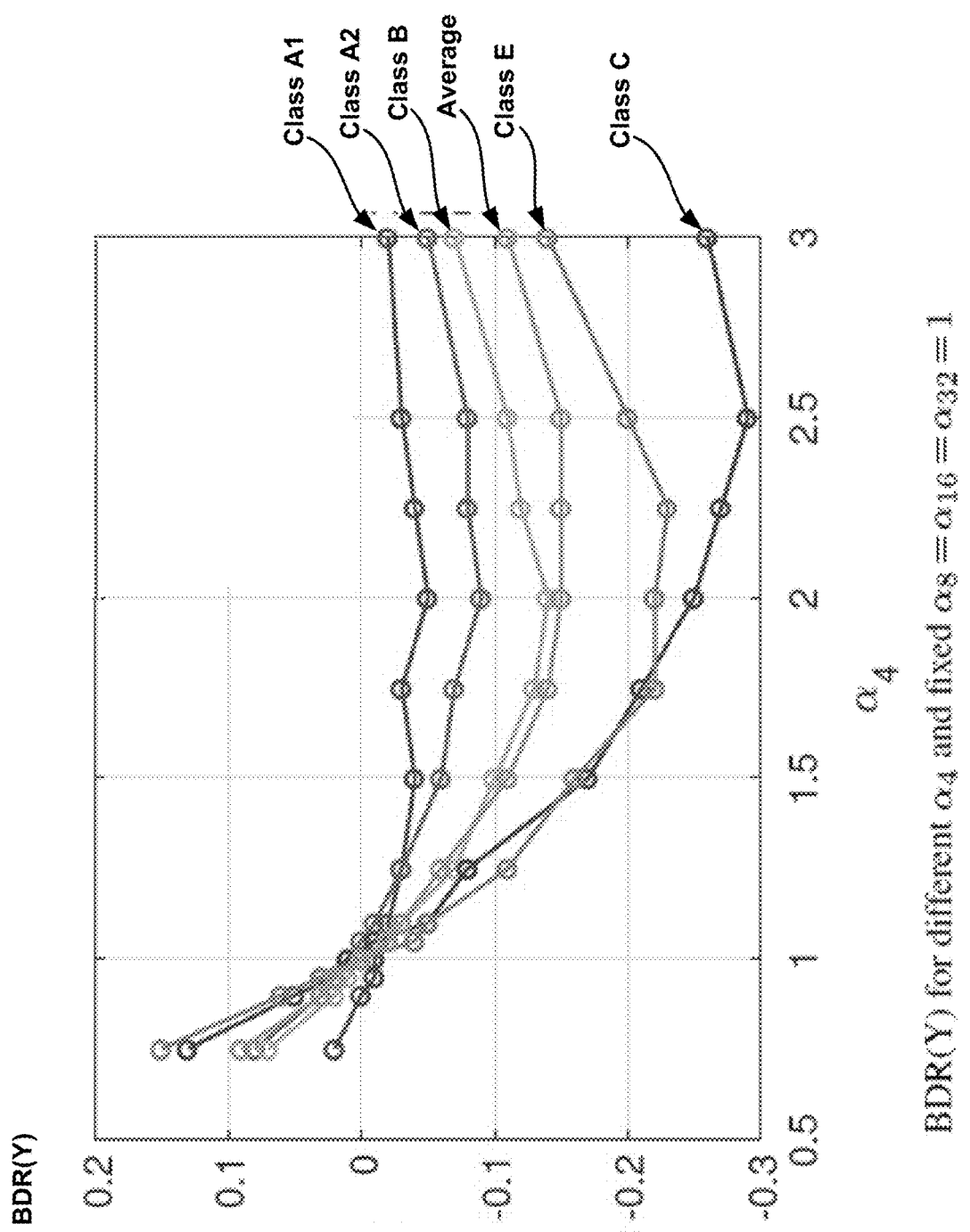
FIGS. 8A-8D illustrate average and per-class performances of N-point graph-based separable transforms (GBSTs).
Figure 8B:
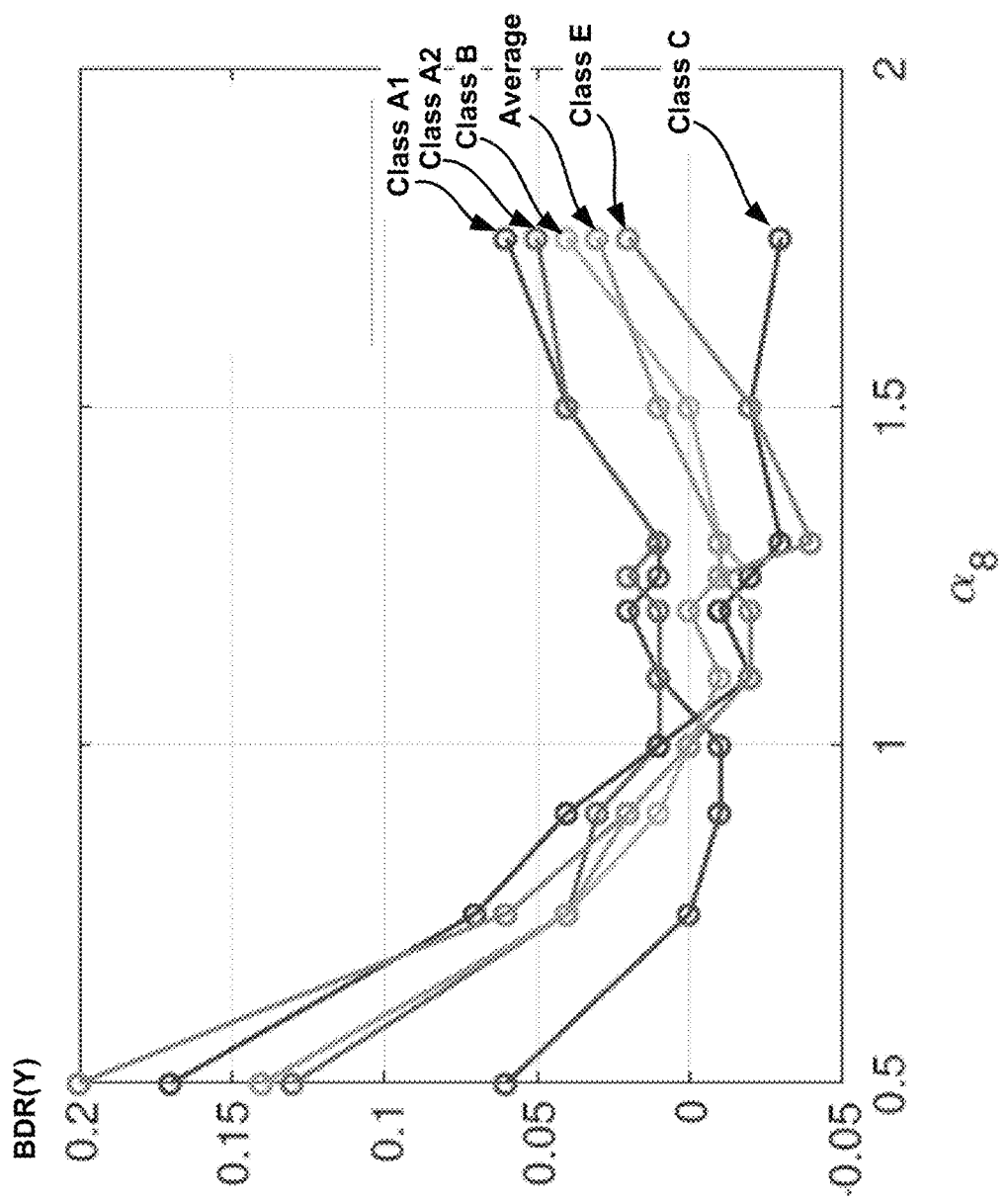
Figure 8C:
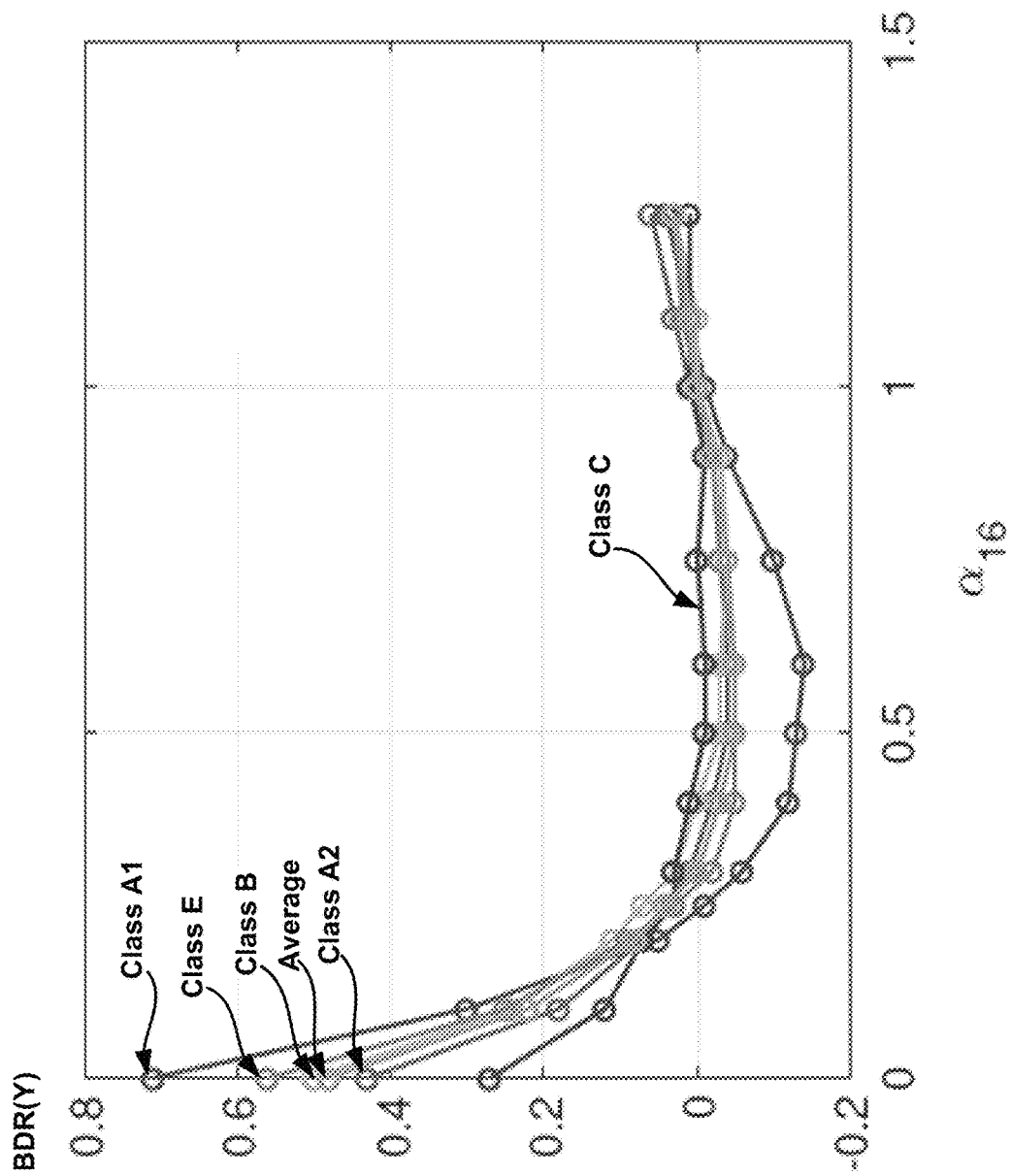
Figure 8D:
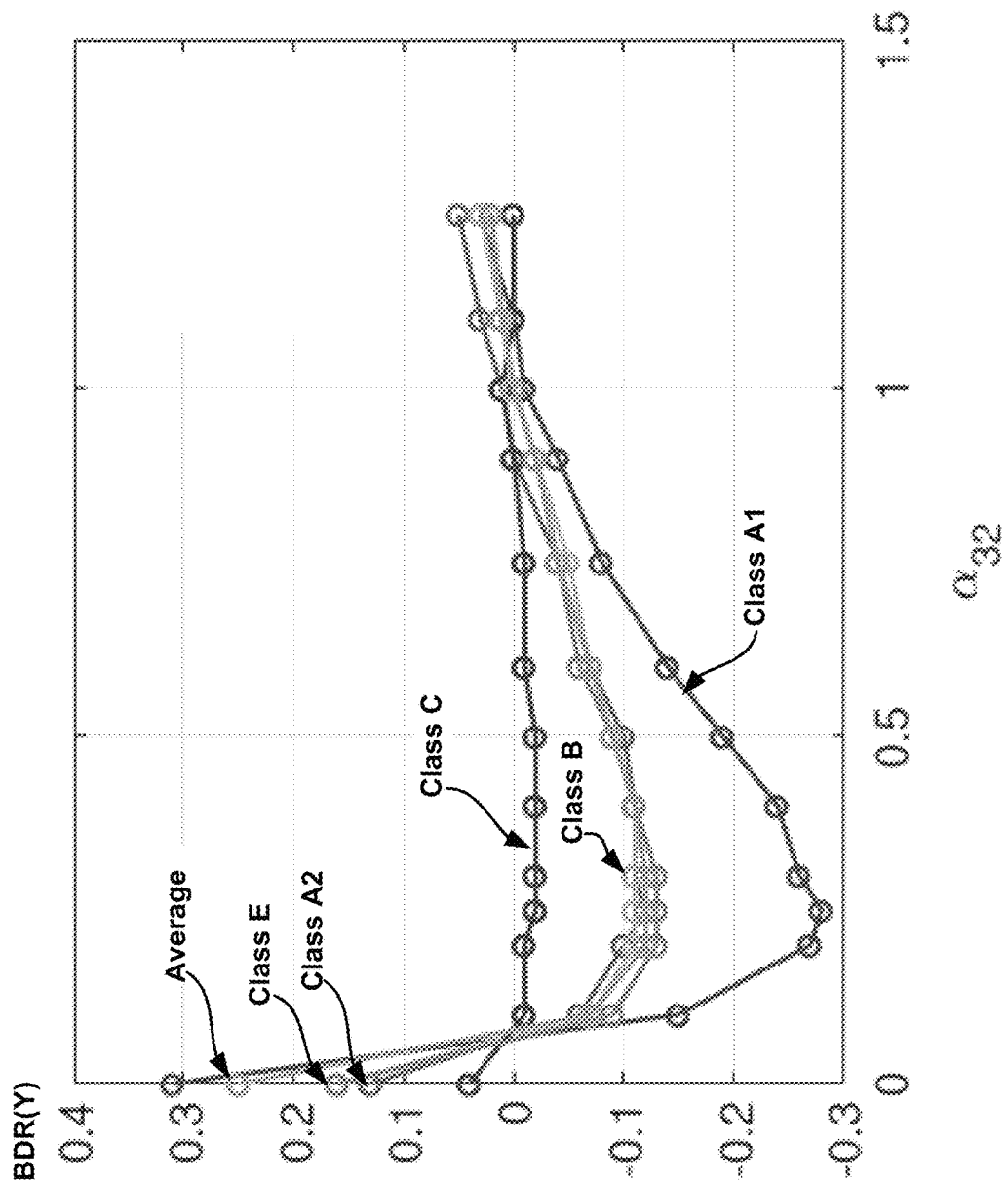

As also described in more detail, a transform matrix can be derived by eigen-decomposition of graph Laplacian matrix defined based on a set of parameters. FIG. 5 illustrates the flow chart of such procedure. In the example of FIG. 5, a graph Laplacian matrix L is defined based on a set of graph parameters (140). Eigen-decomposition of (i.e., diagonalization of) L gives $L=U\Lambda U^T$ so that columns of U are the basis vectors of the transform in double precision and $\Lambda$ is the diagonal matrix consisting of eigenvalues of L (142). As entries of U are real valued numbers, U can be converted to an integer transform by scaling the values (i.e., by multiplying each of its entries) and then rounding to the nearest integer value (144). For example, the scaling can depend on the size (e.g., length) of the transform.

Video encoder 200 can signal the graphs, graph parameters, or the associated graph Laplacian matrices to video decoder 300, and video decoder 300 can generate the set of inverse transforms used for the decoding process by following the example of FIG. 5. For a particular block being decoded, video decoder 300 can select one or more transforms from the generated set. In this context, a graph may refer to a generalized graph Laplacian as discussed in more detail below. The graph may effectively set the form for the graph parameters. Graphs, graph parameters, or graph Laplacian matrices can be signaled by video encoder 200 using a high-level syntax such as SPS or PPS. As part of the PPS-level signaling, the graph-related syntax can be inferred or predicted based on previously coded elements (e.g., frames). Graphs, graph parameters, or graph Laplacian matrices may also be signaled as low-level syntax.

For example, the signaling can be done on a CU/TU basis. The signaling can be done by sending an index value associated with a table of graph-related information. For example, the graph parameters can be listed in a table, and signaling can be done by coding an index value pointing to certain set of graph parameters. The signaled graph information can depend on block size (i.e., TU, CU or transform size). Different sets of graph parameters can be signaled for different block sizes.

Alternatively, the graphs, graph parameters or their associated graph Laplacian matrices needed for transform derivations can be predefined and known at both encoder and decoder. Predefined graph Laplacians can depend on block size.

The example techniques are described for utilizing parametric graph-based separable transforms (GBSTs). In some examples, GBSTs are derived from line graphs with constant edge weights, denoted by $w_c$, and a single vertex weight $v_c$ (also called self-loop) as illustrated in FIGS. 7A and 7B. For example, FIG. 7A illustrates examples of graph weights corresponding to generalized graph Laplacian (GGL) for a first line graph with constant edge weights ($w_c$) and a single self-loop weight ($v_c$) at the first vertex, and FIG. 7B illustrates examples of graph weights correspond to GGL for a second line graph with constant edge weights ($w_c$) and a single self-loop weight ($v_c$) at the last vertex. Examples of GGL, GGL matrices, and the first and second line graphs are described below. The parameters $w_c$ and $v_c$ represent examples of graph parameters.

In this disclosure, graphs of interest may be algebraically represented by GGL matrices. One example of GGL matrix is as follows. Given a weighted graph G(W, V), the generalized graph Laplacian may be defied as: $L=D-W+V$ (equation 1), where W is the adjacency matrix with non-negative edge weights, D is the diagonal degree matrix, and V is the diagonal matrix denoting weighted self-loops (e.g., vertex-weights). The D−W term may be the combinatorial Laplacian matrix described in F. R. K. Chung, "Spectral Graph Theory." USA: American Mathematical Society, 1997, and GGL is obtained by adding the vertex weights in V.

A GBST may be defined by a pair of GBTs derived from the GGLs associated with two weighted line graphs. Examples of GBT and GBST may be as follows. GBT of graph G(W, V) is obtained by eigen-decomposition of the generalized graph Laplacian, $L=D-W+V=U\Lambda U^T$ (equation 2), where columns of U are the basis vectors of the GBT and $\Lambda$ is the diagonal eigenvalue matrix. For GBST, let $U_{row}$ and U-col be N×N GBTs associated with two line graphs with N vertices, then the GBST of an N×N matrix X is $\hat{X} = U_{col}^T X U_{row}$ (equation 3), where $U_{row}$ and $U_{col}$ are the transforms applied to rows and columns of the block signal X, respectively.

In one example, a line graph with N vertices may be used to define its graph Laplacian matrix shown in FIG. 6. Weights can be assigned to edges and/or vertices.

The following describes examples of the parametric framework for GBST construction. For instance, there may be target GGLs representing line graphs. The examples of the line graphs may be the first and second line graphs of FIGS. 7A and 7B.

The following two sets of GGL matrices representing the line graphs may be considered to derive GBSTs, where the first GGL matrix is for the first line graph and the second GGL matrix is for the second line graph. The following may be sets of graph Laplacians, also known as generalized graph Laplacians.

$$\mathcal{L}_1 = \left\{ \begin{bmatrix} w_c + v_c & -w_c & & & 0 \\ -w_c & 2w_c & -w_c & & \\ & \ddots & \ddots & \ddots & \\ & & -w_c & 2w_c & -w_c \\ 0 & & & -w_c & w_c \end{bmatrix} \middle| \begin{array}{l} w_c \geq 0 \\ v_c \geq 0 \end{array} \right\}$$

and $$\mathcal{L}_2 = \left\{ \begin{bmatrix} w_c & -w_c & & & 0 \\ -w_c & 2w_c & -w_c & & \\ & \ddots & \ddots & \ddots & \\ & & -w_c & 2w_c & -w_c \\ 0 & & & -w_c & w_c + v_c \end{bmatrix} \middle| \begin{array}{l} w_c \geq 0 \\ v_c \geq 0 \end{array} \right\}$$

In the above, $w_c$ denotes the constant edge weights of the line graphs, and $v_c$ is the vertex weight (e.g., self-loop weight). For example, as illustrated in FIGS. 7A and 7B, the structural difference, and possibly the only structural difference, in GGL sets is the location of weighted vertex (e.g., first in FIG. 7A and last in FIG. 7B).

Since the graph information can be fully defined based on the parameters $w_c$ and $v_c$, only $w_c$ and $v_c$ can be signaled by video encoder 200 to construct the graph Laplacians used to derive the corresponding inverse transforms at the decoder side (e.g., at video decoder 300). To determine the graph Laplacian set used, another signaling element can be used. For example, a flag can be signaled to identify if $\mathcal{L}_1$ (L1) or $\mathcal{L}_2$ (L2) set is used in addition to parameters $w_c$ and $v_c$. Depending on the block size, different pairs of $w_c$ and $v_c$ can be used, signaled and inferred.

The following describes DCTs and DSTs as GBTs derived from line graphs. Some examples of GBSTs (such as those with certain choices of parameters) may coincide with the discrete sine transform (DST) and discrete cosine transform (DCT) types used in video coding standards including DCT-2, DST-7 and DCT-8. For example, some types of DCTs and DSTs, including DCT-2, DCT-8 and DST-7, are in fact GBTs that can be derived from certain form of GGLs. Based on the results in G. Strang, "The discrete cosine transform," SIAM Rev., vol. 41, no. 1, pp. 135-147, March 1999 and M. Puschel and J. M. F. Moura, "Algebraic signal processing theory: 1-D space," IEEE Transactions on Signal Processing, vol. 56, no. 8, pp. 3586-3599,2008, the parameters $v_c$ and $w_c$ can be selected such that the specified set of GGLs in L1 or L2 correspond to different types of DCTs and DSTs. L1 and L2 are respective examples of the line graph with the matrices shown above.

As one example, different choices of $v_c$ and $w_c$ for GGL sets L1 and L2 results in the following five DCT/DST types:
DCT-2 is derived by setting $v_c = 0$ in L1 or L2;
DST-7 is derived by setting $v_c = w_c$ in L1;
DCT-8 is derived by setting $v_c = w_c$ in L2;
DST-4 is derived by setting $v_c = 2w_c$ in L1; and
DCT-4 is derived by setting $v_c = 2w_c$ in L2.

The relation between different types of DCTs and graph Laplacians may be discussed in "The discrete cosine transform" where DCT-2 is shown to be equal to GBT uniquely obtained from combinatorial graph Laplacians of the following form:

$$L_c = \begin{bmatrix} w_c & -w_c & & & 0 \\ -w_c & 2w_c & -w_c & & \\ & \ddots & \ddots & \ddots & \\ & & -w_c & 2w_c & -w_c \\ 0 & & & -w_c & w_c \end{bmatrix} \text{ for } w_c > 0, \quad \text{(equation 4)}$$

The above equation represents uniformly weighted line graphs with no self-loops (e.g., all edge weights are equal to a positive constant and vertex weights to zero). The form of the above equation for Lc may also be obtained by setting $v_c = 0$ with $w_c > 0$ for the target GGL sets L1 and L2 described above. Moreover, "GBST: Separable transforms based on line graphs for predictive video coding," "Graph-based transforms for video coding," and W. Hu, G. Cheung, and A. Ortega, "Intra-prediction and generalized graph fourier transform for image coding," IEEE Signal Processing Letters, vol. 22, no. 11, pp. 1913-1917, November 2015, showed that DST-7 is equal to the GBT derived from a GGL in L1 with $v_c = w_c$. Similarly, DCT-8 is the GBT derived from a GGL in L2 with $v_c = w_c$. DST-7 and DCT-8 may be considered as closely related transforms, where the basis vectors of one are the reversed (flipped) versions of the other as described in A. Said, H. E. Egilmez, and Y. Chao, "Low-complexity transform adjustments for video coding," in 2019 IEEE International Conference on Image Processing (ICIP), September 2019, pp. 1188-1192, as the only difference in their associated graphs is the location of the self-loop. DST-4 and DCT-4 also share this property.

In order to learn graphs from data, the following parametric GGL estimation problem is formulated:

$$\underset{w_c \geq 0, v_c \geq 0}{\text{minimize}} \quad Tr(L(w_c, v_c)S) - \text{logdet}(L(w_c, v_c)) \quad \text{(equation 5)}$$

subject to $L(w_c, v_c) \in \mathcal{L}_t$

In equation 5, S denotes the sample covariance matrix obtained from data, and $L(w_c, v_c)$ is the GGL variable defined by parameters $v_c$ and $w_c$. Since the minimization criterion is based on negative log-likelihood of a Gaussian-Markov random field (GMRF) whose precision matrix is a GGL, described in H. E. Egilmez, E. Pavez, and A. Ortega, "Graph learning from data under Laplacian and structural constraints," IEEE Journal of Selected Topics in Signal Processing, vol. 11, no. 6, pp. 825-841, September 2017, this is a constrained maximum-likelihood (ML) problem for estimating a GGL over the constraint set Lt defined by the parameters $v_c$ and $w_c$.

This disclosure describes solving the instances of (equation 5) where the constraint set Lt can be either L1 or L2 described above. Since (equation 5) is a convex optimization problem, as described in S. Boyd and L. Vandenberghe, "Convex Optimization" New York, N.Y., USA: Cambridge University Press, 2004, and the dimension of the problem is small, the CVX software such as M. Grant and S. Boyd, "CVX: Matlab software for disciplined convex programming, version 2.1," http://cvxr.com/cvx, March 2014 may be used to find the optimal solutions for $w_c$ and $v_c$.

As a more efficient alternative to CVX, the GGL estimation algorithm proposed in "Graph learning from data under Laplacian and structural constraints" and H. E. Egilmez, E. Pavez, and A. Ortega, "GLL: Graph Laplacian learning package, version 1.0," https://github.com/STAC-USC/Graph Learning, 2017 can be modified to accommodate the constraints in L1 and L2 by introducing projected descent steps.

To design GBSTs, as one example, this disclosure describes a two-step procedure to optimize a GGL matrices used to derive transforms. In the first step, the problem in (equation 5) is solved to find the optimal parameters ($w_c^*$ and $v_c^*$) that best capture the input data statistics (sample covariance S) in a maximum-likelihood sense. The residual data is collected by using the VVC reference software (version 2), VTM-2.0, where the row and column statistics (S) are obtained from intra coded residual blocks.

After solving (equation 5), the second step refines the optimized GGL matrix, $L((w_c^*, v_c^*))$ by normalizing entries of the GGL and then rounding the normalized vertex weight to a value of admissible precision. A refinement step may be needed to limit the precision of parameters for coding systems. Moreover, the normalization of GGLs may make the analysis of models with different number of vertices (dimensions) easier.

As one example, an estimated GGL is normalized by dividing with $w_c^*$ as $\hat{L} = (1/w_c^*) L((w_c^*, v_c^*))$. Accordingly, the edge weights of the graph associated with $\hat{L}$ are equal to 1, and its non-zero vertex weight is equal to $v_c^*/w_c^*$. The normalization of GGLs may not have an impact on their corresponding GBTs, since the set of eigenvectors (i.e., U) in (equation 2) are invariant to scaling of L. For the rounding, a normalized vertex weight ($v_c^*/w_c^*$) is rounded to the nearest integer multiple of 0.25. The resulting rounded vertex weight may be denoted as $\alpha_N$, where N is the transform length (or number of vertices).

The proposed two-step approach may be applied to design GBSTs as alternatives to DST-7 and DCT-8 in VVC. Since VVC allows 4, 8, 16 and 32-point DST-7/DCT-8, GBSTs may be optimized for the same transform lengths. The example techniques may result in $\alpha_4=2$, $\alpha_8=1$, $\alpha_{16}=0.75$ and $\alpha_{32}=0.25$ for 4, 8, 16 and 32-point GBSTs, respectively.

The $w_c$ parameter in $\mathcal{L}_1$ (simply L1) or $\mathcal{L}_2$ (simply L2) can be set to 1 and only $\alpha_N = v_c$ can be used to define graph Laplacians and derive associated transforms. In this case, only $\alpha_N = v_c$ value may be signaled.

Different $\alpha_N$ values can be signaled for different block sizes (i.e., for different N). $\alpha_N$ can be directly signaled using unary or fixed length codes. $\alpha_N$ can be signaled based on an index to a table where $\alpha_N$ candidates are listed. The entries of the table can be different for different N (i.e., block size). A table may contain a list of $\alpha_N$ with values ranging from 0 to 3. For example, the table may consist of the following values: [0 0.25 0.5 0.75 1 1.25 1.5 1.75 2 2.25 2.5 2.75 3]. The index can be coded unary or fixed-length codes. Alternatively, the index can be inferred and not signaled for certain block sizes (N).

In some examples, the $\alpha_N$ value can be inferred depending on block size (N). For example, $\alpha_4$ can be set to 2 for 4-point transforms, $\alpha_8$ can be set to 1 for 8-point transforms, $\alpha_{16}$ can be set to 0.75 for 16-point transforms, and $\alpha_{32}$ can be set to 0.25 for 32-point transforms.

Based on the description above of DCTs and DSTs as GBTs derived from line graphs, the results of proposed approach can be interpreted as follows:

Since $\alpha_4 = 2$ for L1 and L2 corresponds to DST-4 and DCT-4, respectively, the proposed approach may indicate replacing DST-7 with DST-4 and DCT-8 with DCT-4 for 4-point transforms to improve coding gains.

For 8-point transforms, the approach may indicate to keep DST-7 and DCT-8, because $\alpha_8 = 1$ for L1 and L2 leads to DST-7 and DCT-8, respectively.

As $\alpha_N = 0$ would indicate using DCT-2 and $\alpha_N = 1$ corresponds to DST-7/DCT-8, the 16-point GBST derived from $\alpha_{16} = 0.75$ leads to a transform that is closer to DST-7/DCT-8 as compared to DCT-2, yet $\alpha_{32} = 0.25$ generates a 32-point GBST that is closer to DCT-2 than DST-7/DCT-8.

The following describes some performance data related to the above example techniques. The performance data is merely provided as example and should not be considered as limiting or a requirement that the example techniques have to generate the example performance data.

The performance of the proposed GBSTs are tested under common test conditions (CTC) described in F. Bossen, J. Boyce, K. S˝uhring, X. Li, and V. Seregin, "JVET common test conditions and software reference configurations for SDR video," Joint Video Exploration Team (WET) of ITU-T SG16 WP3 and ISO/IEC JTC 1/SC29/WG11, Macao, C N, Output Document JVET L1010, October 2018 on the VVC reference software (version 2), VTM-2.0, by replacing the DST-7 and DCT-8 with the GBSTs for different transform lengths (i.e., 4, 8, 16 and 32-point transforms).

Table 1 below shows the coding gains achieved by using the proposed set of GBSTs over the VTM-2.0 anchor with DST-7 and DCT-8 in terms of BD-rates using calculation techniques described in G. Bjøntegaard, "Calculation of average PSNR differences between RD-curves," ITU-T SG16 Q.6, Austin, Tex., Tech. Rep. VCEG-M33, April 2001. In table 1, coding performance of GBSTs over VTM-2.0 under all-intra configurations in terms of BD-rates (BDR) is shown. Negative percentage values indicate coding gain improvements.

TABLE 1

|    | Sequences       | BDR(Y)  | BDR(U)  | BDR(V)  |
|----|-----------------|---------|---------|---------|
| A1 | Tango2          | −0.49%  | 0.04%   | 0.05%   |
|    | FoodMarket4     | −0.58%  | 0.27%   | 0.33%   |
|    | Campfire        | −0.21%  | 0.17%   | 0.23%   |
| A2 | CatRobot1       | −0.19%  | 0.39%   | 0.30%   |
|    | DaylightRoad2   | −0.34%  | 0.50%   | 0.07%   |
|    | ParkRunning3    | −0.24%  | 0.24%   | 0.30%   |
| B  | MarketPlace     | −0.14%  | 0.42%   | 0.45%   |
|    | RitualDance     | −0.33%  | 0.13%   | 0.20%   |
|    | Cactus          | −0.32%  | −0.19%  | 0.02%   |
|    | BasketballDrive | −0.42%  | 0.12%   | −0.02%  |
|    | BQTerrace       | −0.28%  | −0.21%  | −0.05%  |
| C  | BasketballDrill | −0.21%  | −0.26%  | −0.11%  |
|    | BQMall          | −0.43%  | −0.27%  | −0.43%  |
|    | PartyScene      | −0.41%  | −0.44%  | −0.40%  |
|    | RaceHorses      | −0.34%  | 0.01%   | −0.06%  |
| E  | FourPeople      | −0.43%  | −0.27%  | −0.43%  |
|    | Johnny          | −0.54%  | −0.25%  | −0.69%  |
|    | KristenAndSara  | −0.65%  | −0.41%  | −0.77%  |
| Average |             | −0.36%  | 0.00%   | 0.04%   |

On average, the techniques described in this disclosure may provide luma coding gains of 0.36% (in Y component).

Practically, no loss is observed for chroma channel (in U and V components), since VTM-2.0 only applies multiple separable transform candidates on the luma blocks. For all the sequences in CTC, luma coding gains are observed, and gains up to 0.6% are achieved for some of the ultra-high-definition (UHD) sequences in class A1.

FIGS. 8A-8D illustrate average and per-class luma BD-rate performances of N-point GBSTs across different $\alpha_N$ values over VTM-2.0. For instance, FIGS. 8A-8D show BD-rates of only replacing N-point DST-7 and DCT-8 with N-point GBSTs for different $\alpha_N$ values. For example, in FIG. 8C, only 16-point transforms are replaced by GBSTs derived from different am while keeping 4, 8 and 32-point DST-7 and DCT-8 (i.e., $\alpha_4 = \alpha_8 = \alpha_{32} = 1$). The results empirically validate the techniques described in this disclosure resulting in $\alpha_4=2$, $\alpha_8=1$, $\alpha_{16}=0.75$, and $\alpha_{32}=0.25$, all of which are very close to the best $\alpha_N$ with smallest BDR(Y) in FIGS. 8A-8D, respectively.

FIGS. 8A-8D also show that the impact of changing $\alpha_N$ on the BDR(Y) depends on the resolution of sequences. For example, in FIG. 8A, the coding gains for classes A1 and A2 with high-resolution are very limited, while for classes with lower resolution (e.g., class C) the gains are significant for larger $\alpha_4$. However, in FIG. 8D, smaller $\alpha_{32}$ leads to significant coding gains for classes A1 and A2, yet the gains may be negligible for class C.

Accordingly, this disclosure describes a parametric approach to build graph-based separable transforms (GBSTs) better capturing the residual block statistics as compared to DST-7 and DCT-8. An optimized set of GBSTs are constructed and tested on the VVC reference software VTM-2.0 by replacing the DST-7 and DCT-8 in VVC. The experimental results demonstrated that proposed GBSTs considerably improve the coding efficiency over the VTM-2.0 anchor.

The following references may provide additional information related to transforms: U.S. Pat. No. 10,306,229, U.S. Patent Publication No. 2018/0020218, and U.S. patent Ser. No. 16/426,749.

Figure 9:
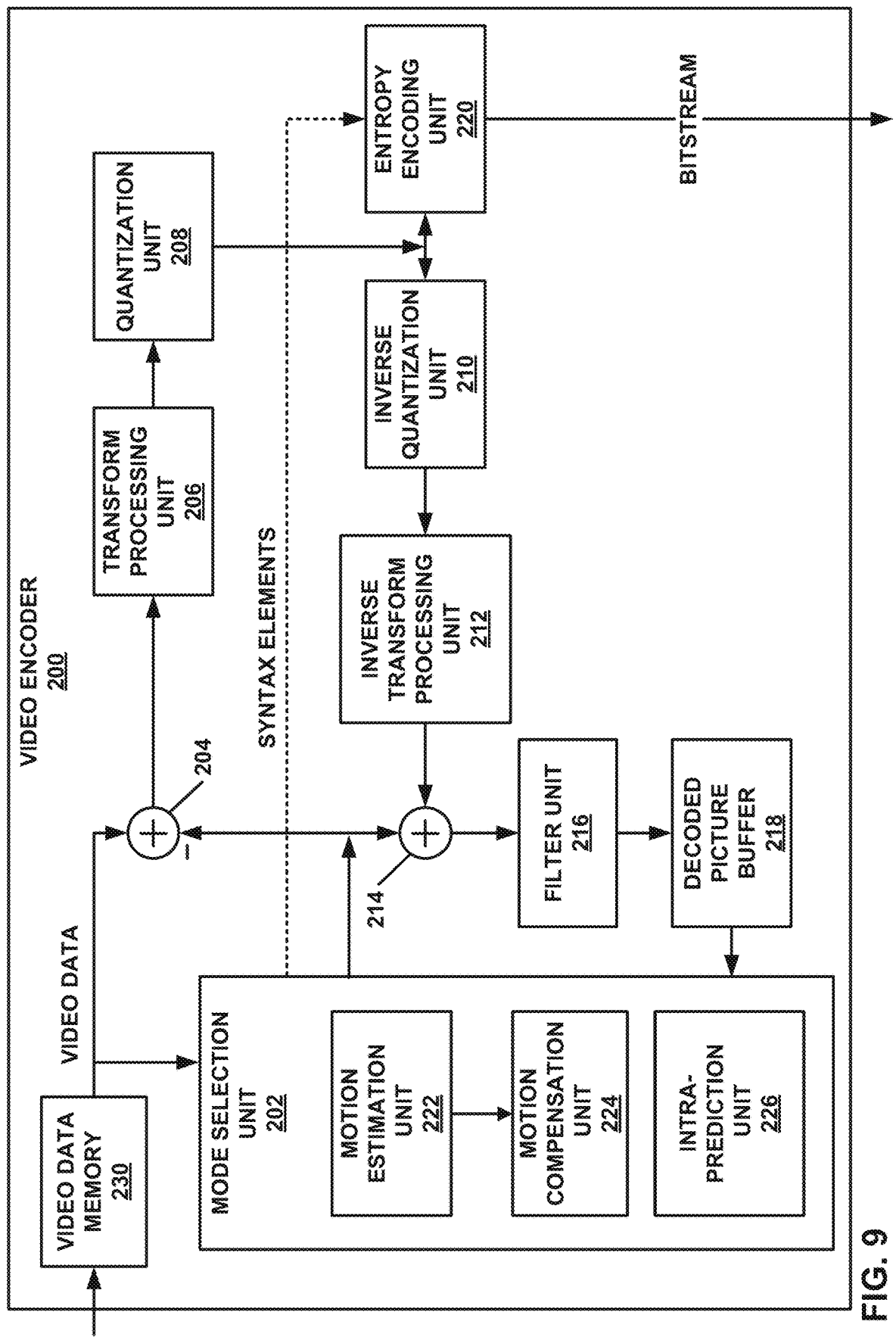
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine residual information in a sample domain, determine a graph Laplacian set to use, determine at least one of edge weights and vertex weights of a line graph for the determined graph Laplacian, determine a graph Laplacian matrix based on the edge weights and the vertex weights and the graph Laplacian, and apply a graph-based separable transform (GBST) on the residual information to transform the residual information from the sample domain to a transform domain, wherein applying the GBST comprises applying the GBST based on the graph Laplacian matrix.

Figure 10:
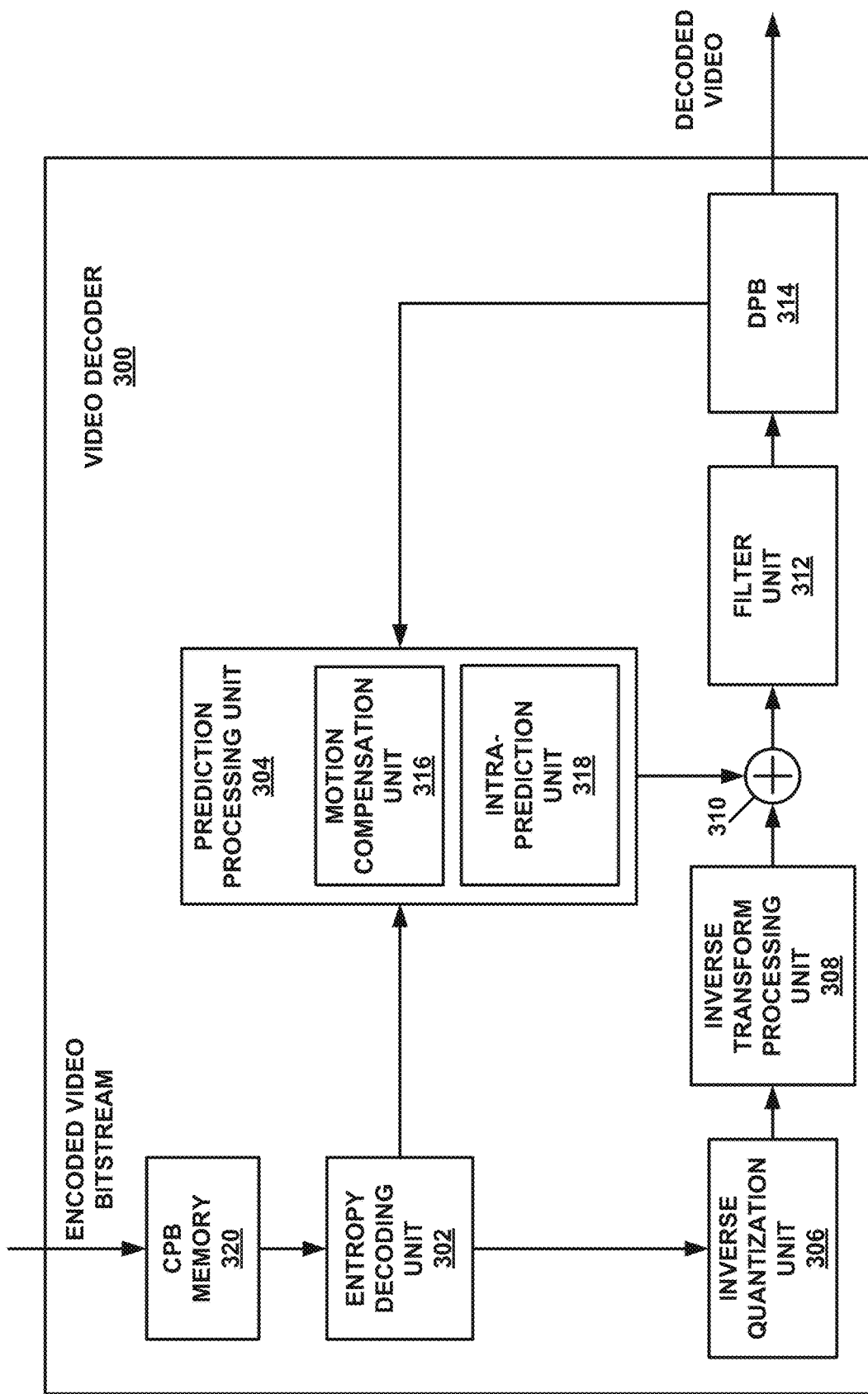
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). For example, entropy decoding unit 302 may receive, in a syntax structure that applies to a current block, graph-related information, as described above. Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. Inverse transform unit 308, may for example, determine a transform matrix based on the received graph-related syntax information and perform an inverse transform based on the determined transform matrix of one or more coefficient values to generate a residual block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive residual information in a transform domain and apply a graph-based separable transform (GBST) on the residual information to transform the residual information from the transform domain to a sample domain. To apply the GBST, video decoder 300 may be configured to determine a graph Laplacian set to use, determine at least one of edge weights and vertex weights of a line graph for the determined graph Laplacian, determine a graph Laplacian matrix based on the edge weights and the vertex weights and the graph Laplacian, and apply the GBST based on the graph Laplacian matrix.

Figure 11:
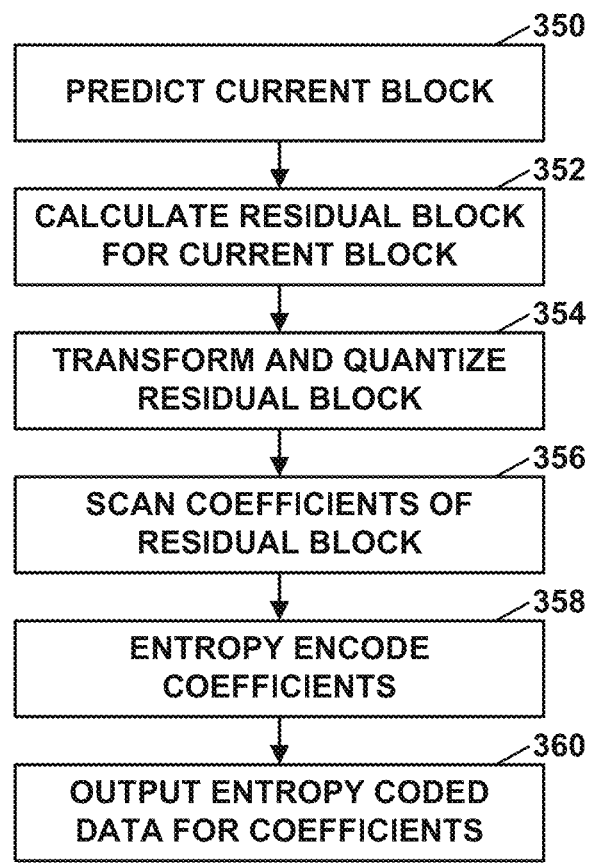
FIG. 11 is a flowchart illustrating an example method for encoding a current block.

FIG. 11 is a flowchart illustrating an example method for encoding a current block. The current block may comprise a current CU. Although described with respect to video encoder 200 (FIGS. 1 and 9), it should be understood that other devices may be configured to perform a method similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). The entropy encoded data may include graph-related information for determining the transform used by video encoder 200 to transform the quantized coefficients.

Figure 12:
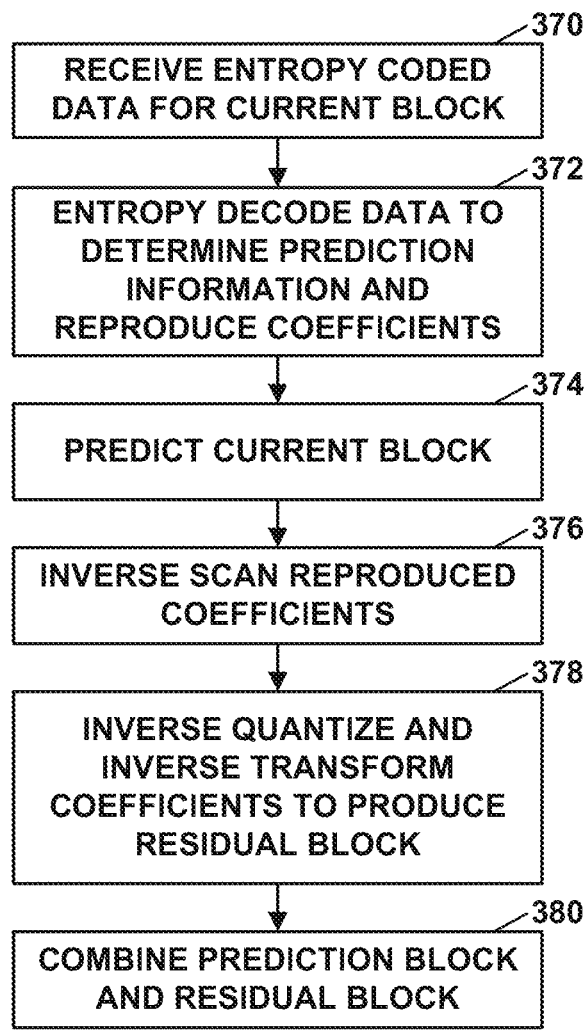
FIG. 12 is a flowchart illustrating an example method for decoding a current block of video data.

FIG. 12 is a flowchart illustrating an example method for decoding a current block of video data. The current block may comprise a current CU. Although described with respect to video decoder 300 (FIGS. 1 and 10), it should be understood that other devices may be configured to perform a method similar to that of FIG. 12.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may, for example, determine the inverse transform to apply to the transform coefficients based on received graph-related information as described throughout this disclosure. Video decoder 300 may ultimately decode the current block by combining the prediction block and the residual block (380).

Figure 13:
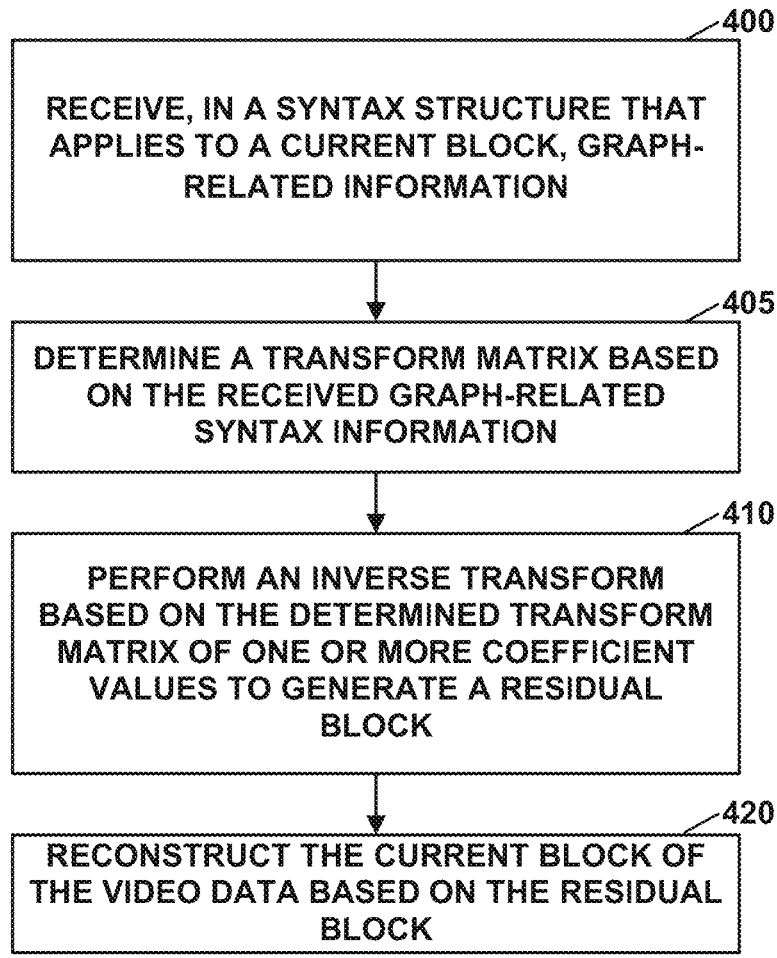
FIG. 13 is a flow diagram illustrating an example operation of decoding video data, in accordance with one or more techniques of this disclosure.

FIG. 13 is a flow diagram illustrating an example operation of decoding video data, in accordance with one or more techniques of this disclosure. As seen in the example of FIG. 13, video decoder 300 initially may receive, in a syntax structure that applies to a current block, graph-related information (400). As described above, the graph-related information may, for example, includes one or more of graphs, graph parameters, or graph Laplacian matrices. The syntax structure may, for example, be an SPS or a PPS. In some examples, to receive the graph-related syntax information, video decoder 300 may be configured to receive an index into a look-up table for graph-related information.

Next, video decoder 300 may determine a transform matrix based on the received graph-related syntax information (405). To determine the transform matrix based on the received graph-related syntax information, video decoder 300 may be configured to determine a graph Laplacian matrix based on the graph-related information; perform an Eigen-decomposition operation on the graph Laplacian matrix to determine one or more basis vectors; scale values of the one or more basis vectors; and round the scaled values to integer values to determine the transform matrix. In some examples, the graph-related information may include one or more constant edge weights and one or more vertex weights, and to determine the graph Laplacian matrix based on the graph-related information, video decoder 300 may be configured apply the one or more constant edge weights and one or more vertex weights to a generalized graph Laplacian matrix to determine the graph Laplacian matrix. The graph-related information may also include a syntax element identifying the generalized graph Laplacian matrix in a set of generalized graph Laplacian matrices.

Next, video decoder 300 may perform an inverse transform based on the determined transform matrix of one or more coefficient values to generate a residual block (410).

Next, video decoder 300 may reconstruct the current block of the video data based on the residual block (415). Video decoder 300 may, for example, output the filtered reconstructed block as part of a picture of decoded video data. Video decoder 300 may perform one or more filtering operations on the reconstructed block prior to outputting. Video decoder 300 may output the picture of decoded video data by displaying the picture of decoded video data, storing the picture of decoded video data for later display, or storing the picture of decoded video data for use in decoding other picture of video data.

The following clauses are within the scope of the description above and represent example techniques and implementations for video encoder 200 and/or video decoder 300.

Clause 1: A method of decoding video data that includes receiving residual information in a transform domain; and applying a graph-based separable transform (GBST) on the residual information to transform the residual information from the transform domain to a sample domain; wherein applying the GBST comprises: determining a graph Laplacian set to use; determining at least one of edge weights and vertex weights of a line graph for the determined graph Laplacian; determining a graph Laplacian matrix based on the edge weights and the vertex weights and the graph Laplacian; and applying the GBST on the residual information in the transform domain based on the graph Laplacian matrix.

Clause 2: The method of clause 1, wherein determining the graph Laplacian set to use comprises receiving information indicative of the graph Laplacian set to use.

Clause 3: The method of any of clauses 1 and 2, wherein determining at least one of edge weights and vertex weights of the line graph for the determined graph Laplacian comprises receiving information indicative of the at least one of edge weights and vertex weights of the line graph.

Clause 4: The method of clause 1, wherein determining the graph Laplacian set to use comprises inferring information indicative of the graph Laplacian set to use.

Clause 5: The method of any of clauses 1 and 4, wherein determining at least one of edge weights and vertex weights of the line graph for the determined graph Laplacian comprises inferring information indicative of the at least one of edge weights and vertex weights of the line graph.

Clause 6: A method of encoding video data that includes determining residual information in a sample domain; determining a graph Laplacian set to use; determining at least one of edge weights and vertex weights of a line graph for the determined graph Laplacian; determining a graph Laplacian matrix based on the edge weights and the vertex weights and the graph Laplacian; and applying a graph-based separable transform (GBST) on the residual information in the sample domain to transform the residual information from the sample domain to a transform domain, wherein applying the GBST comprises applying the GBST based on the graph Laplacian matrix.

Clause 7: The method of clause 6, further that includes signaling information indicative of one or more of the graph Laplacian set to use, the edge weights, and the vertex weights Clause 8: A device for decoding video data that includes memory configured to store video data; and processing circuitry configured to perform the method of any of clauses 1-5.

Clause 9: A device for encoding video data that includes memory configured to store video data; and processing circuitry configured to perform the method of any of clauses 6 and 7.

Clause 10: The device of any of clauses 8 and 9, further comprising a display configured to display decoded video data.

Clause 11: The device of any of clauses 8-10, wherein the device comprises one or more of a camera, a computer, a mobile device, a broadcast receiver device, or a set-top box.

Clause 12: A computer-readable storage medium having stored thereon instructions that, when executed, cause one or more processors to perform the method of any of clauses 1-5 or clauses 6 and 7.

Clause 13: A device for coding video data, the device comprising means for performing the method of any of clauses 1-5 or clauses 6 and 7.14. Any combination of techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, in a syntax structure that applies to a plurality of blocks including a current block of the video data, graph-related information, wherein the graph-related information comprises one or more constant edge weights, one or more vertex weights, and a syntax element identifying a generalized graph Laplacian matrix in a set of generalized graph Laplacian matrices;
   determining a transform matrix for inclusion in a set of transform matrices for the plurality of blocks based on the received graph-related syntax information, wherein determining the transform matrix comprises:
      applying the one or more constant edge weights and the one or more vertex weights to the generalized graph Laplacian matrix to determine a graph Laplacian matrix;
      performing an Eigen-decomposition operation on the graph Laplacian matrix to determine one or more basis vectors;
      scaling values of the one or more basis vectors; and
      rounding the scaled values to integer values to determine the transform matrix;
   selecting, from the set of transform matrices for the plurality of blocks, the transform matrix for the current block;
   performing an inverse transform, based on the selected transform matrix, on one or more coefficient values for the current block to generate a residual block; and
   reconstructing the current block of the video data based on the residual block.

2. The method of claim 1, wherein the graph-related information includes one or more of graphs, graph parameters, or graph Laplacian matrices.

3. The method of claim 1, wherein the syntax structure comprises one of a sequence parameter set or a picture parameter set.

4. The method of claim 1, wherein receiving the graph-related syntax information comprises receiving an index into a look-up table for the graph-related information.

5. A device for decoding video data, the device comprising:
   a memory configured to store the video data; and
   one or more processors implemented in circuitry and configured to:
      receive, in a syntax structure that applies to a plurality of blocks including a current block of the video data, graph-related information, wherein the graph-related information comprises one or more constant edge weights, one or more vertex weights, and a syntax element identifying a generalized graph Laplacian matrix in a set of generalized graph Laplacian matrices;
      determine a transform matrix for inclusion in a set of transform matrices for the plurality of blocks based on the received graph-related syntax information, wherein to determine the transform matrix, the one or more processors are configured to:
         apply the one or more constant edge weights and the one or more vertex weights to the generalized graph Laplacian matrix to determine a graph Laplacian matrix
         perform an Eigen-decomposition operation on the graph Laplacian matrix to determine one or more basis vectors;
         scale values of the one or more basis vectors; and
         rounding the scaled values to integer values to determine the transform matrix;
      select, from the set of transform matrices for the plurality of blocks, the transform matrix for the current block;
      perform an inverse transform, based on the selected transform matrix, on one or more coefficient values to generate a residual block; and
      reconstruct the current block of the video data based on the residual block.

6. The device of claim 5, wherein the graph-related information includes one or more of graphs, graph parameters, or graph Laplacian matrices.

7. The device of claim 5, wherein the syntax structure comprises one of a sequence parameter set or a picture parameter set.

8. The device of claim 5, wherein to receive the graph-related syntax information, the one or more processors are further configured to receive an index into a look-up table for the graph-related information.

9. The device of claim 5, wherein the device comprises a wireless communication device, further comprising a receiver configured to receive encoded video data.

10. The device of claim 9, wherein the wireless communication device comprises a telephone handset and wherein the receiver is configured to demodulate, according to a wireless communication standard, a signal comprising the encoded video data.

11. The device of claim 5, further comprising:
    a display configured to display decoded video data.

12. The device of claim 5, wherein the device comprises one or more of a camera, a computer, a mobile device, a broadcast receiver device, or a set-top box.

13. A non-transitory computer-readable storage medium having stored thereon instructions that, when executed, configure a processor to:
   receive, in a syntax structure that applies to a plurality of blocks including a current block of the video data, graph-related information, wherein the graph-related information comprises one or more constant edge weights, one or more vertex weights, and a syntax element identifying a generalized graph Laplacian matrix in a set of generalized graph Laplacian matrices;
   determine a transform matrix for inclusion in a set of transform matrices for the plurality of blocks based on the received graph-related syntax information, wherein to determine the transform matrix, the instructions configure the processor to:
      apply the one or more constant edge weights and the one or more vertex weights to the generalized graph Laplacian matrix to determine a graph Laplacian matrix
      perform an Eigen-decomposition operation on the graph Laplacian matrix to determine one or more basis vectors;
      scale values of the one or more basis vectors; and
      rounding the scaled values to integer values to determine the transform matrix;
   select, from the set of transform matrices for the plurality of blocks, the transform matrix for the current block;
   perform an inverse transform, based on the selected transform matrix, on one or more coefficient values to generate a residual block; and
   reconstruct the current block of the video data based on the residual block.

14. The non-transitory computer-readable storage medium of claim 13, wherein the graph-related information includes one or more of graphs, graph parameters, or graph Laplacian matrices.

15. The non-transitory computer-readable storage medium of claim 13, wherein the syntax structure comprises one of a sequence parameter set or a picture parameter set.

16. The non-transitory computer-readable storage medium of claim 13, wherein the instructions configure the processor to receive an index into a look-up table for the graph-related information.

17. A device for decoding video data, the device comprising:
   means for receiving, in a syntax structure that applies to a plurality of blocks including a current block of the video data, graph-related information, wherein the graph-related information comprises one or more constant edge weights, one or more vertex weights, and a syntax element identifying a generalized graph Laplacian matrix in a set of generalized graph Laplacian matrices;
   means for determining a transform matrix for inclusion in a set of transform matrices for the plurality of blocks based on the received graph-related syntax information, wherein the means for determining the transform matrix comprises:
      means for applying the one or more constant edge weights and the one or more vertex weights to the generalized graph Laplacian matrix to determine a graph Laplacian matrix
      means for performing an Eigen-decomposition operation on the graph Laplacian matrix to determine one or more basis vectors;
      means for scaling values of the one or more basis vectors; and
      rounding the scaled values to integer values to determine the transform matrix;
   means for selecting, from the set of transform matrices for the plurality of blocks, the transform matrix for the current block;
   means for performing an inverse transform, based on the selected transform matrix, on one or more coefficient values for the current block to generate a residual block; and
   means for reconstructing the current block of the video data based on the residual block.

18. The device of claim 17, wherein the graph-related information includes one or more of graphs, graph parameters, or graph Laplacian matrices.

19. The device of claim 17, wherein the syntax structure comprises one of a sequence parameter set or a picture parameter set.

20. The device of claim 17, wherein the means for receiving the graph-related syntax information comprises means for receiving an index into a look-up table for the graph-related information.

* * * * *